US012783214B2

(12) United States Patent
Grigore et al.

(10) Patent No.: US 12,783,214 B2
(45) Date of Patent: Nov. 3, 2026

(54) AUTOMATIC CODE GENERATION FOR ROBOTIC PROCESS AUTOMATION

(71) Applicant: UiPath, Inc., New York, NY (US)

(72) Inventors: Mircea Grigore, Bucharest (RO); Alexandru Roman, Bucharest (RO)

(73) Assignee: UiPath, Inc., New York, NY (US)

( * ) Notice: Subject to any disclaimer, the term of this patent is extended or adjusted under 35 U.S.C. 154(b) by 219 days.

(21) Appl. No.: 18/543,349

(22) Filed: Dec. 18, 2023

(65) Prior Publication Data

US 2025/0199774 A1 Jun. 19, 2025

(51) Int. Cl.

| | |
|---|---|
| ***G06F 9/44*** | (2018.01) |
| ***G06F 8/30*** | (2018.01) |
| ***G06F 9/445*** | (2018.01) |
| ***G06F 9/45*** | (2006.01) |
| ***G06F 9/455*** | (2018.01) |
| ***G06F 40/40*** | (2020.01) |

(52) U.S. Cl.

CPC ................ *G06F 8/30* (2013.01); *G06F 40/40* (2020.01)

(58) Field of Classification Search

CPC ............ G06F 8/30; G06F 40/40; G06F 8/447; G06F 8/315; G06F 8/33; G06F 8/44; G06N 20/00; G06N 3/006

See application file for complete search history.

(56) References Cited

U.S. PATENT DOCUMENTS

| | | | |
|---|---|---|---|
| 10,642,604 B2 | 5/2020 | Hansen et al. | |
| 10,860,905 B1 | 12/2020 | Gligan et al. | |
| 11,200,539 B2 | 12/2021 | Iyer et al. | |
| 11,301,269 B1 | 4/2022 | Singh | |
| 11,507,655 B1 | 11/2022 | Ketireddy et al. | |
| 11,733,668 B2 * | 8/2023 | Hall .................. | G05B 19/0426 700/86 |

(Continued)

FOREIGN PATENT DOCUMENTS

| | | | |
|---|---|---|---|
| CN | 116719520 A | 9/2023 | |
| CN | 117193751 A | 12/2023 | |
| JP | 2022552127 A * | 12/2022 | ............ G06N 5/046 |

OTHER PUBLICATIONS

Liu Kai, Research On "AI+RPA" Interactive Technology of Intelligent Financial Management Platform, 2022, pp. 1-5. https://ieeexplore.ieee.org/stamp/stamp.jsp?tp=&arnumber=10016525 (Year: 2022).*

(Continued)

*Primary Examiner* — Mongbao Nguyen
(74) *Attorney, Agent, or Firm* — LeonardPatel PC; Michael A. Leonard, II; Sheetal S. Patel

(57) ABSTRACT

Automatic code generation for robotic process automation (RPA) that uses a cognitive artificial intelligence (AI) layer to automatically generate computer program code, text, or other items based on an input source is disclosed. Expressions and/or code snippets may be generated for RPA workflows that provide code in a programming language or convert code from one language to another. The input source may include natural language sentence(s), source document(s), pseudocode written by a user for a desired task, etc. These inputs may be used to modify an RPA workflow, generate a new RPA workflow, create a document describing a task, generate an application, etc.

27 Claims, 15 Drawing Sheets

(56) References Cited

U.S. PATENT DOCUMENTS

| | | | | |
|---|---|---|---|---|
| 11,748,069 | B2 | 9/2023 | Grigore | |
| 11,954,458 | B2 * | 4/2024 | Joshi | G06Q 10/063 |
| 12,226,916 | B2 * | 2/2025 | Sisley | G06N 20/00 |
| 2019/0236485 | A1 | 8/2019 | Stanley, III et al. | |
| 2020/0134374 | A1 * | 4/2020 | Oros | G06N 3/09 |
| 2021/0192412 | A1 * | 6/2021 | Krishnaswamy | G06Q 10/06316 |
| 2021/0224644 | A1 * | 7/2021 | Mathur | G06N 20/00 |
| 2022/0067520 | A1 * | 3/2022 | Dalli | G06F 18/214 |
| 2022/0075605 | A1 | 3/2022 | Iyer et al. | |
| 2022/0107817 | A1 * | 4/2022 | Bakshi | G05B 13/041 |
| 2022/0113991 | A1 | 4/2022 | Singh | |
| 2022/0343250 | A1 | 10/2022 | Tremblay et al. | |
| 2022/0398460 | A1 * | 12/2022 | Dalli | G06F 18/2163 |
| 2023/0093280 | A1 | 3/2023 | Singh et al. | |
| 2023/0214192 | A1 * | 7/2023 | Makhija | G06N 5/01 717/105 |
| 2023/0334395 | A1 | 10/2023 | Gorroño et al. | |
| 2023/0393832 | A1 * | 12/2023 | Touati | H04L 67/10 |
| 2024/0111498 | A1 * | 4/2024 | Vaughn | G06F 8/30 |
| 2024/0427563 | A1 * | 12/2024 | Roy | G06F 8/31 |
| 2025/0061374 | A1 * | 2/2025 | Lopes | G06N 20/00 |

OTHER PUBLICATIONS

Md Mazharul Islam, SoCeR: A new source code recommendation technique for code reuse, 2020, pp. 1-6. https://ieeexplore.ieee.org/stamp/stamp.jsp?tp=&arnumber=9202820 (Year: 2020).*

Zhen Zeng, FlowMind: Automatic Workflow Generation with LLMs, 2023, pp. 1-9. https://dl.acm.org/doi/pdf/10.1145/3604237.3626908 (Year: 2023).*

Ganeshayya Shidaganti, Robotic Process Automation with AI and OCR to Improve Business Process: Review, 2021, pp. 1-7. https://ieeexplore.ieee.org/stamp/stamp.jsp?arnumber=9532902 (Year: 2021).*

Frank F. Xu, In-IDE Code Generation from Natural Language: Promise and Challenges, 2021, pp. 1-11. https://arxiv.org/pdf/2101.11149 (Year: 2021).*

Bo Zhang, Knowledge Base Enhanced ChatGLM for RPA Robot Code Generation, 2023, pp. 1-5. https://dl.acm.org/doi/pdf/10.1145/3650215.3650386 (Year: 2023).*

English Translation, (JP 2022552127 A), 2022, pp. 1-15. (Year: 2022).*

Extended European Search Report, issued Apr. 10, 2025, EP Patent Application No. 24221105.0.

"AI code-generation software: What it is and how it works," IBM Education, available at https://www.ibm.com/blog/ai-code-generation/ (Sep. 19, 2023).

"ElectroNeek's 9.4 Release: Leverage AI, RPA, and No-code Activities to Build Automation Faster," available at https://electroneek.com/blog/electroneek-9-4-release-for-automation-success/ (Jun. 8, 2023).

"ServiceNow expands generative AI capabilities with case summarization and text-to-code to drive speed, productivity, and value," available at https://www.servicenow.com/company/media/press-room/genai-text-to-code-case-summarization.html (Jul. 26, 2023).

George Roth, "Leveraging ChatGPT in Automation Development and Design," available at https://www.uipath.com/blog/ai/leveraging-chatgpt-with-automation-development (Feb. 15, 2023).

Office Action, issued Jan. 30, 2026, EP Patent Application No. 24221105.0.

* cited by examiner

AUTOMATIC CODE GENERATION FOR ROBOTIC PROCESS AUTOMATION

FIELD

The present invention generally relates to artificial intelligence (AI), and more specifically, to automatic code generation for robotic process automation (RPA) that uses a cognitive AI layer to translate an input source to computer program code.

BACKGROUND

During development of RPA workflows, developers may need to build expressions or create and invoke snippets of code written in Python, Visual Basic (VB), C#, C++, Java, C, etc. However, this requires both programming knowledge and knowledge of the specific programming language that will be used. Thus, only relatively advanced users can take advantage of these features, and even experienced developers may inadvertently introduce errors into RPA workflow logic. Accordingly, an improved and/or alternative approach to RPA workflow development may be beneficial.

SUMMARY

Certain embodiments of the present invention may provide solutions to the problems and needs in the art that have not yet been fully identified, appreciated, or solved by current RPA technologies. For example, some embodiments of the present invention pertain to automatic code generation for RPA that uses a cognitive AI layer to translate an input source to computer program code.

In an embodiment, a non-transitory computer-readable medium stores a computer program. The computer program is configured to cause at least one processor to provide source data to a cognitive AI layer as input. The cognitive AI layer is configured to process the input. The computer program is also configured to cause at least one processor to receive an output from the cognitive AI layer including automatically generated code and implement the automatically generated code in an RPA workflow.

In another embodiment, one or more computing systems include memory storing computer program instructions and at least one processor configured to execute the stored computer program instructions. The computer program instructions are configured to cause the at least one processor to provide source data to a cognitive AI layer as input. The cognitive AI layer is configured to process the input. The computer program instructions are also configured to cause the at least one processor to receive an output from the cognitive AI layer including automatically generated code and implement the automatically generated code in an RPA workflow. The source data includes natural language text, a recording of a user's speech, a video recording of a user's actions on a computing system, a document, pseudocode for a desired task, a drawing of a desired user interface or form, a drawing of a process, process documentation or a process description, an RPA workflow, or any combination thereof.

In yet another embodiment, a computer-implemented method for performing automatic code generation includes providing source data to a cognitive AI layer as input, by a computing system. The cognitive AI layer is configured to process the input. The computer-implemented method also includes receiving an output from the cognitive AI layer including automatically generated code, by the computing system. The computer-implemented method further includes implementing the automatically generated code in an RPA workflow, by the computing system. The source data includes natural language text, a recording of a user's speech, a video recording of a user's actions on a computing system, a document, pseudocode for a desired task, a drawing of a desired user interface or form, a drawing of a process, process documentation or a process description, an RPA workflow, or any combination thereof.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

Figure 1:
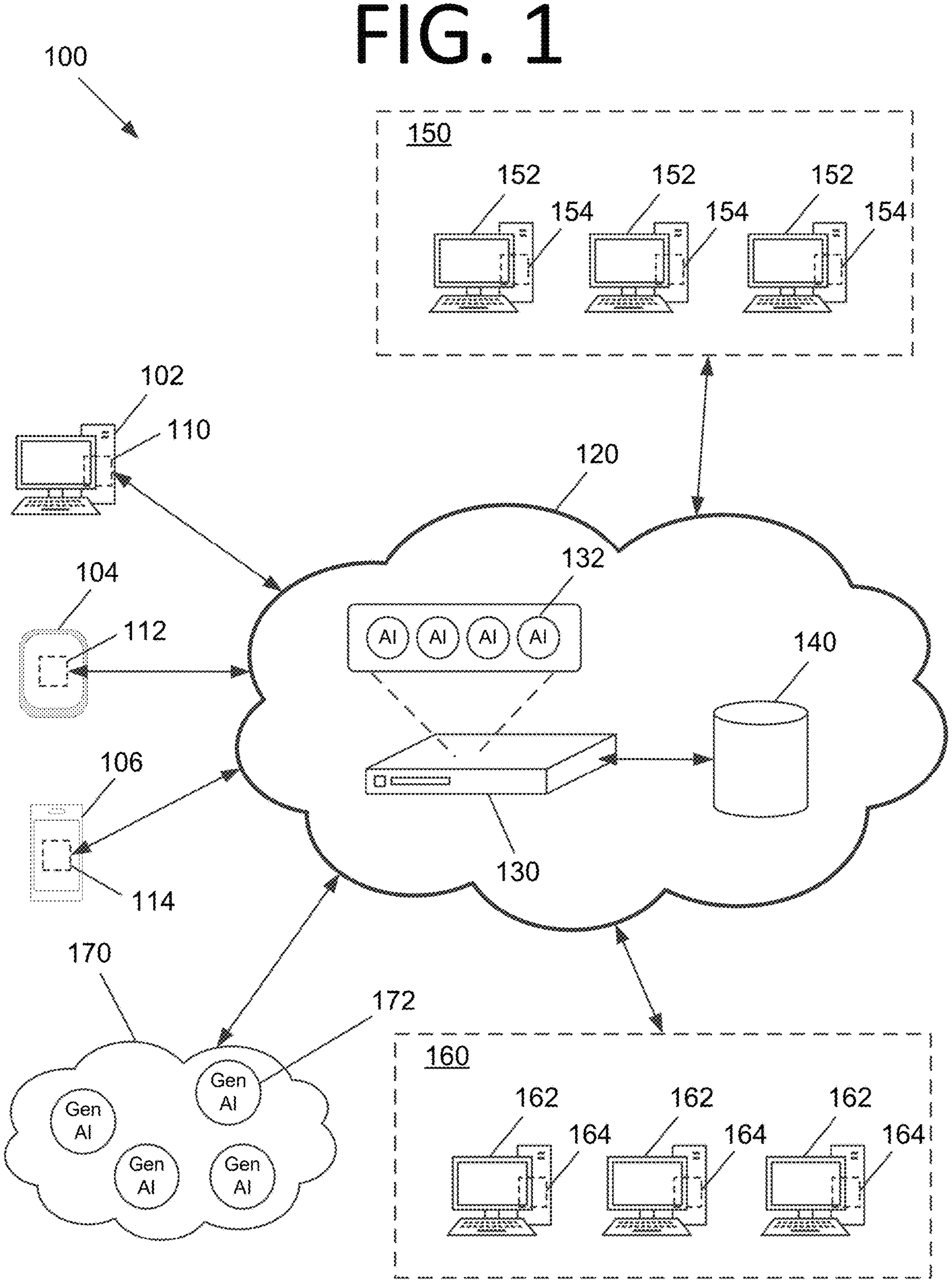
FIG. 1 is an architectural diagram illustrating a hyperautomation system, according to an embodiment of the present invention.

Some embodiments pertain to automatic code generation for RPA that uses a cognitive AI layer to automatically generate computer program code, text, or other items based on an input source. Such embodiments may remove language barriers due to an RPA developer not having programming experience or a programmer not knowing one or more programming languages. In order to remove these language barriers, some embodiments translate text or another input source into expressions or snippets of code in one or more programming languages. Expressions are syntactic entities in a programming language that can be evaluated to determine the value thereof. Expressions are a combination of one or more constants, variables, functions, and operators that the programming language interprets according to its particular rules of precedence and of association and computes to produce another value. Code snippets are relatively small regions of reusable source code, machine code, or text.

With respect to expressions and snippets, there are times when RPA developers need to adapt RPA workflow code for various purposes. Even though RPA workflow development may be a relatively low code process compared to other types of programming, there is a degree of customization that is achieved through the code of expressions and snippets. Typically, this code does not fundamentally change the scope of the RPA workflow, but rather, enriches it.

Various programming languages may be supported by an RPA designer application. For instance, UiPath Studio™ currently supports Python, VB, and C#. To take advantage of these features, RPA developers typically must know the respective programming languages. However, in some embodiments, generative AI models, such as large language models (LLMs), may be used to create an expression or a snippet of code that performs a specific action responsive to a user request, or responsive to interpreting an input source. Such embodiments may be further enriched with coded workflows or coded test cases based on the user request or input source. Coded workflows or test cases are a way to write code for RPA robots. Developers can use C#code or code in some other language instead of a low code visual RPA workflow designer. This may place the full power of .NET in the hands of RPA developers with the platform benefits of the RPA designer application (RPA robots, orchestrators, insights, test managers, etc.).

Responsive to the user request or input source, some embodiments generate expressions that are part of workflow activities or activity configurations (e.g., a certain expression may be assigned to derive a certain activity parameter value). Certain embodiments may configure code in different invoke sections or snippets. For instance, some embodiments may generate an activity from a UI object repository or some other source with a certain configuration, or entirely new code may be generated. The cognitive AI layer may thus generate expressions and code snippets that are incorporated into RPA workflows.

The input source can take various forms. For instance, a user may enter a natural language sentence, provide a source document (e.g., a spreadsheet file, a JavaScript Object Notation (JSON) file, an Extensible Application Markup Language (XAML) file, an Extensible Markup Language (XML) file, a Hypertext Markup Language (HTML) file, a Word® document, a Portable Document Format (PDF) file, a scanned image of a physical document, etc.), write pseudocode for the desired task, etc. In some embodiments, the cognitive AI layer may be able to suggest RPA automations based on this input alone.

Consider the case where a PDF is an invoice. The cognitive AI layer may determine that the type of the PDF is an invoice and learn that for such invoices, users typically want to extract data therefrom any time an invoice is received. The cognitive AI layer may then suggest an automation to the user and automatically generate the automation, if desired. This may involve creating an RPA workflow with the appropriate activities, such as opening the invoice, performing optical character recognition (OCR) on the invoice if it was scanned, for example, extracting the text and numbers therefrom, and saving this information to a billing system, for example.

Any suitable information may be used as a source for such automations. For instance, the cognitive AI layer may use a process definition document (PDD), an information technology (IT) policy, an approval interface, etc. as the source. The source information may then be used to generate high level automations that the user can further refine, if desired. In some embodiments, the cognitive AI layer may add security and/or compliance rules to the generated RPA workflow to ensure that the workflow complies with laws and/or policies. Task mining outputs (e.g., what applications a user is using, what information is entered into these applications, key presses, mouse clicks and locations, graphical elements in the user interface (UI), which graphical elements are the active elements at various times, etc.) may be used to help generate the RPA workflows in some embodiments. See, for example, U.S. Patent Application Publication No. 2022/0113991 and U.S. Pat. No. 11,301,269, which are hereby incorporated by reference in their entirety.

In some embodiments, the cognitive AI layer may determine what a user was doing based on the task mining outputs and document the process. For instance, an LLM of the cognitive AI layer may be used to generate a human-like description of the operations that the user is performing, potentially including screenshots. This information may then be provided as a manual for other users that want to perform the respective tasks.

In some embodiments, automations may be created from such recordings. By understanding what the user is doing and mapping the actions to RPA workflow activities, the cognitive AI layer may automatically create RPA workflows based on the actions taken in the recordings. This may allow automation of user tasks without even a cursory knowledge of RPA on the part of the user.

In some embodiments, a diagram representing a design of a screen may be used to automatically generate an associated application. Consider the case where a user has designed a Visio® diagram of a UI for a screen, such as a form for collecting and submitting certain data to a Customer Relationship Management (CRM) system. The cognitive AI layer may use a CV model to understand what graphical elements and text are present on the screen, and a generative AI model may create a software application that includes these graphical elements and submission capability to the CRM system, such as capturing customer information and submitting this information to Salesforce®. As such, a user can provide a form and the cognitive AI layer can build a UI for the form. Thus, such embodiments can essentially convert depictions of graphical elements and text into code.

In some embodiments, a user may submit a diagram of a desired process to automate. The high level steps of this process may then be generated as an RPA workflow. For instance, the generative AI model may be trained to understand text in the steps and the associations therebetween as shown by connectors.

When developing automations using an RPA tool such as UiPath's Form Builder™, manual customization and a lengthy process may be required to import data sources. Also, creating a setup of dynamic form elements such as drop-down lists is a time-consuming process. Furthermore, developers with specialized coding skills and knowledge are required to incorporate complex functionality while developing automations. For instance, writing code or incorporating complex functionality using activities such as <Invoke code> requires deep knowledge and specialized coding skills.

Accordingly, some embodiments leverage natural language processing (NLP) to automate form building and code generation in automation development. A natural language description is provided by the user (e.g., using interface 800 shown in FIGS. 8A-C). An LLM may then be used to process this description and understand the user's intent. As a result, a form is automatically built or other code is automatically generated based on the user description.

The natural language description may be used to define the appearance of a user interface. For example, the user may prompt a query description in natural language in an RPA designer application to generate a form for an insurance claim with the policy holder's name, policy number, claim details, and date of incident. Next, the RPA designer application automatically generates a form, populates the form with the requested fields, and configures the required validations and proper input types for the fields.

The user is also capable of adding new fields to generated forms in some embodiments. For instance, using the example in the previous paragraph, the user may provide a natural language description to add fields for the estimated claim amount and supporting documents. Thus, the tool adds or updates the requested information in the form. Furthermore, the fully functional form can be used to build various desired types of automations. For example, the inputs for the automation may be taken from the form, and an email may be sent to the user with the policy details.

The LLM(s) of some embodiments convert user descriptions into machine-executable code. For example, invoke code activities may be used, and a user description in natural language may be provided to "calculate the total number of days since the incident occurred based on the date of the incident, and if older than 10 days, a set needs review." Furthermore, the code may be generated in any suitable programming language based on the user description in some embodiments. Adjustments can be made to the generated code by the LLM(s) to accommodate a given programming language.

The embodiments disclosed herein may provide various advantages over existing automation technologies. The manual effort involved in form building and code generation for other purposes in RPA may be reduced, thus accelerating process implementation and reducing the need for coding expertise. This may increase the number of RPA projects that an organization can create and manage, and per project development time may be reduced. Developers with coding expertise may be freed up to focus on designing efficient workflows rather than on creating forms or writing attendant code.

FIG. 1 is an architectural diagram illustrating a hyper-automation system 100, according to an embodiment of the present invention. "Hyper-automation," as used herein, refers to automation systems that bring together components of process automation, integration tools, and technologies that amplify the ability to automate work. For instance, robotic process automation (RPA) may be used at the core of a hyper-automation system in some embodiments, and in certain embodiments, automation capabilities may be expanded with AI/machine learning (ML), process mining, analytics, and/or other advanced tools. As the hyper-automation system learns processes, trains AI/ML models, and employs analytics, for example, more and more knowledge work may be automated, and computing systems in an organization, e.g., both those used by individuals and those that run autonomously, may all be engaged to be participants in the hyper-automation process. Hyper-automation systems of some embodiments allow users and organizations to efficiently and effectively discover, understand, and scale automations.

Hyper-automation system 100 includes user computing systems, such as desktop computer 102, tablet 104, and smart phone 106. However, any desired user computing system may be used without deviating from the scope of the invention including, but not limited to, smart watches, laptop computers, servers, Internet-of-Things (IoT) devices, etc. Also, while three user computing systems are shown in FIG. 1, any suitable number of user computing systems may be used without deviating from the scope of the invention. For instance, in some embodiments, dozens, hundreds, thousands, or millions of user computing systems may be used. The user computing systems may be actively used by a user or run automatically without much or any user input.

Each user computing system 102, 104, 106 has respective automation process(es) 110, 112, 114 running thereon. In some embodiments, the automation processes are stored remotely (e.g., on server 130 or in database 140 and accessed via network 120) and loaded by RPA robots to implement the automation. Automations may exist as a script (e.g., XML, XAML, etc.) or be compiled into machine readable code (e.g., as a digital link library).

Automation process(es) 110, 112, 114 may include, but are not limited to, RPA robots, part of an operating system, downloadable application(s) for the respective computing system, any other suitable software and/or hardware, or any combination of these without deviating from the scope of the invention. In some embodiments, one or more of process(es) 110, 112, 114 may be listeners. Listeners may be RPA robots, part of an operating system, a downloadable application for the respective computing system, or any other software and/or hardware without deviating from the scope of the invention. Indeed, in some embodiments, the logic of the listener(s) is implemented partially or completely via physical hardware.

Listeners monitor and record data pertaining to user interactions with respective computing systems and/or operations of unattended computing systems and send the data to a core hyper-automation system 120 via a network (e.g., a local area network (LAN), a mobile communications network, a satellite communications network, the Internet, any combination thereof, etc.). The data may include, but is not limited to, which buttons were clicked, where a mouse was moved, the text that was entered in a field, that one window was minimized and another was opened, the application associated with a window, etc. In certain embodiments, the data from the listeners may be sent periodically as part of a heartbeat message. In some embodiments, the data may be sent to core hyper-automation system 120 once a predetermined amount of data has been collected, after a predetermined time period has elapsed, or both. One or more servers, such as server 130, receive and store data from the listeners in a database, such as database 140.

Automation processes may execute the logic developed in workflows during design time. In the case of RPA, workflows may include a set of steps, defined herein as "activities," that are executed in a sequence or some other logical flow. Each activity may include an action, such as clicking a button, reading a file, writing to a log panel, etc. In some embodiments, workflows may be nested or embedded.

Long-running workflows for RPA in some embodiments are master projects that support service orchestration, human intervention, and long-running transactions in unattended environments. See, for example, U.S. Pat. No. 10,860,905, which is hereby incorporated by reference in its entirety. Human intervention comes into play when certain processes require human inputs to handle exceptions, approvals, or validation before proceeding to the next step in the activity. In this situation, the process execution is suspended, freeing up the RPA robots until the human task completes.

A long-running workflow may support workflow fragmentation via persistence activities and may be combined with invoke process and non-user interaction activities, orchestrating human tasks with RPA robot tasks. In some embodiments, multiple or many computing systems may participate in executing the logic of a long-running workflow. The long-running workflow may run in a session to facilitate speedy execution. In some embodiments, long-running workflows may orchestrate background processes that may contain activities performing API calls and running in the long-running workflow session. These activities may be invoked by an invoke process activity in some embodiments. A process with user interaction activities that runs in a user session may be called by starting a job from a conductor activity (conductor described in more detail later herein). The user may interact through tasks that require forms to be completed in the conductor in some embodiments. Activities may be included that cause the RPA robot to wait for a form task to be completed and then resume the long-running workflow.

One or more of automation process(es) 110, 112, 114 is in communication with core hyper-automation system 120. In some embodiments, core hyper-automation system 120 may run a conductor application on one or more servers, such as server 130. While one server 130 is shown for illustration purposes, multiple or many servers that are proximate to one another or in a distributed architecture may be employed without deviating from the scope of the invention. For instance, one or more servers may be provided for conductor functionality, AI/ML model serving, authentication, governance, and/or any other suitable functionality without deviating from the scope of the invention. In some embodiments, core hyper-automation system 120 may incorporate or be part of a public cloud architecture, a private cloud architecture, a hybrid cloud architecture, etc. In certain embodiments, core hyper-automation system 120 may host multiple software-based servers on one or more computing systems, such as server 130. In some embodiments, one or more servers of core hyper-automation system 120, such as server 130, may be implemented via one or more virtual machines (VMs).

In some embodiments, one or more of automation process(es) 110, 112, 114 may call one or more AI/ML models 132 deployed on or accessible by core hyper-automation system 120 and trained to accomplish various tasks. For instance, AI/ML models 132 may include models trained to look for various application versions, perform CV, perform OCR, UI descriptors, offer suggestions for next activities or sequences of activities in RPA workflows, etc. AI/ML models may be trained using labeled data that includes, but is not limited to, elements from data sources (e.g., web pages, forms, scanned documents, application interfaces, screens, etc.), previously created RPA workflows, screenshots of various application screens for various versions with their corresponding UI elements, libraries of UI objects, etc. AI/ML models 132 may be trained to achieve a desired confidence threshold while not being overfit to a given set of training data.

AI/ML models 132 may be trained for any suitable purpose without deviating from the scope of the invention, as will be discussed in more detail later herein. Two or more of AI/ML models 132 may be chained in some embodiments (e.g., in series, in parallel, or a combination thereof) such that they collectively provide collaborative output(s). AI/ML models 132 may perform or assist with CV, OCR, document processing and/or understanding, semantic learning and/or analysis, analytical predictions, process discovery, task mining, testing, automatic RPA workflow generation, sequence extraction, clustering detection, audio-to-text translation, any combination thereof, etc. However, any desired number and/or type(s) of AI/ML models may be used without deviating from the scope of the invention. Using multiple AI/ML models may allow the system to develop a global picture of what is happening on a given computing system, for example. For instance, one AI/ML model could perform OCR, another could detect buttons, another could compare sequences, etc. Patterns may be determined individually by an AI/ML model or collectively by multiple AI/ML models. In certain embodiments, one or more AI/ML models are deployed locally on at least one of computing systems 102, 104, 106.

In some embodiments, multiple AI/ML models 132 may be used. Each AI/ML model 132 is an algorithm (or model) that runs on the data, and the AI/ML model itself may be a deep learning neural network (DLNN) of trained artificial "neurons" that are trained on training data, for example. In some embodiments, AI/ML models 132 may have multiple layers that perform various functions, such as statistical modeling (e.g., hidden Markov models (HMMs)), and utilize deep learning techniques (e.g., long short term memory (LSTM) deep learning, encoding of previous hidden states, etc.) to perform the desired functionality.

Hyper-automation system 100 may provide four main groups of functionality in some embodiments: (1) discovery; (2) building automations; (3) management; and (4) engagement. Automations (e.g., run on a user computing system, a server, etc.) may be run by software robots, such as RPA robots, in some embodiments. For instance, attended robots, unattended robots, and/or test robots may be used. Attended robots work with users to assist them with tasks (e.g., via UiPath Assistant™). Unattended robots work independently of users and may run in the background, potentially without user knowledge. Test robots are unattended robots that run test cases against applications or RPA workflows. Test robots may be run on multiple computing systems in parallel in some embodiments.

The discovery functionality may discover and provide automatic recommendations for different opportunities of automations of business processes. Such functionality may be implemented by one or more servers, such as server 130. The discovery functionality may include providing an automation hub, process mining, task mining, and/or task capture in some embodiments. The automation hub (e.g., UiPath Automation Hub™) may provide a mechanism for managing automation rollout with visibility and control. Automation ideas may be crowdsourced from employees via a submission form, for example. Feasibility and ROI calculations for automating these ideas may be provided, documentation for future automations may be collected, and collaboration may be provided to get from automation discovery to build-out faster.

Process mining (e.g., via UiPath Automation Cloud™ and/or UiPath AI Center™) refers to the process of gathering and analyzing the data from applications (e.g., enterprise resource planning (ERP) applications, customer relation management (CRM) applications, email applications, call center applications, etc.) to identify what end-to-end processes exist in an organization and how to automate them effectively, as well as indicate what the impact of the automation will be. This data may be gleaned from user computing systems 102, 104, 106 by listeners, for example, and processed by servers, such as server 130. One or more AI/ML models 132 may be employed for this purpose in some embodiments. This information may be exported to the automation hub to speed up implementation and avoid manual information transfer. The goal of process mining may be to increase business value by automating processes within an organization. Some examples of process mining goals include, but are not limited to, increasing profit, improving customer satisfaction, regulatory and/or contractual compliance, improving employee efficiency, etc.

Task mining (e.g., via UiPath Automation Cloud™ and/or UiPath AI Center™) identifies and aggregates workflows (e.g., employee workflows), and then applies AI to expose patterns and variations in day-to-day tasks, scoring such tasks for ease of automation and potential savings (e.g., time and/or cost savings). One or more AI/ML models 132 may be employed to uncover recurring task patterns in the data. Repetitive tasks that are ripe for automation may then be identified. This information may initially be provided by listeners and analyzed on servers of core hyper-automation system 120, such as server 130, in some embodiments. The findings from task mining (e.g., XAML process data) may be exported to process documents or to a designer application such as UiPath Studio™ to create and deploy automations more rapidly. Task mining in some embodiments may include taking screenshots with user actions (e.g., mouse click locations, keyboard inputs, application windows and graphical elements the user was interacting with, timestamps for the interactions, etc.), collecting statistical data (e.g., execution time, number of actions, text entries, etc.), editing and annotating screenshots, specifying types of actions to be recorded, etc.

Task capture (e.g., via UiPath Automation Cloud™ and/or UiPath AI Center™) automatically documents attended processes as users work or provides a framework for unattended processes. Such documentation may include desired tasks to automate in the form of process definition documents (PDDs), skeletal workflows, capturing actions for each part of a process, recording user actions and automatically generating a comprehensive workflow diagram including the details about each step, Microsoft Word® documents, XAML files, and the like. Build-ready workflows may be exported directly to a designer application in some embodiments, such as UiPath Studio™. Task capture may simplify the requirements gathering process for both subject matter experts explaining a process and Center of Excellence (CoE) members providing production-grade automations.

Building automations may be accomplished via a designer application (e.g., UiPath Studio™, UiPath StudioX™, or UiPath Studio Web™). For instance, RPA developers of an RPA development facility 150 may use RPA designer applications 154 of computing systems 152 to build and test automations for various applications and environments, such as web, mobile, SAP®, and virtualized desktops. API integration may be provided for various applications, technologies, and platforms. Predefined activities, drag-and-drop modeling, and a workflow recorder, may make automation easier with minimal coding. Document understanding functionality may be provided via Drag-and-drop AI skills for data extraction and interpretation that call one or more AI/ML models 132. Such automations may process virtually any document type and format, including tables, checkboxes, signatures, and handwriting. When data is validated or exceptions are handled, this information may be used to retrain the respective AI/ML models, improving their accuracy over time.

RPA designer application 152 may be designed to call one or more of trained AI/ML models 132 on server 130 and/or generative AI models 172 in a cloud environment via network 120 (e.g., a local area network (LAN), a mobile communications network, a satellite communications network, the Internet, any combination thereof, etc.) to assist with the RPA automation development process. In some embodiments, one or more of the AI/ML models may be packaged with RPA designer application 152 or otherwise stored locally on computing system 150.

In some embodiments, RPA designer application 152 and one or more of AI/ML models 132 may be configured to use an object repository stored in database 140. See, for example, U.S. Pat. No. 11,748,069, which is hereby incorporated by reference in its entirety. The object repository may include libraries of UI objects that can be used to develop RPA workflows via RPA designer application 152. The object repository may be used to add UI descriptors to activities in the workflows of RPA designer application 152 for UI automations. In some embodiments, one or more of AI/ML models 132 may generate new UI descriptors and add them to the object repository in database 140. Once automations are completed in designer application 152, they may be published on server 130, pushed out to computing systems 102, 104, 106, etc.

An integration service may allow developers to seamlessly combine UI automation with API automation, for example. Automations may be built that require APIs or traverse both API and non-API applications and systems. A repository (e.g., UiPath Object Repository™) or marketplace (e.g., UiPath Marketplace™) for pre-built RPA and AI templates and solutions may be provided to allow developers to automate a wide variety of processes more quickly. Thus, when building automations, hyper-automation system 100 may provide user interfaces, development environments, API integration, pre-built and/or custom-built AI/ML models, development templates, integrated development environments (IDEs), and advanced AI capabilities. Hyper-automation system 100 enables development, deployment, management, configuration, monitoring, debugging, and maintenance of RPA robots in some embodiments, which may provide automations for hyper-automation system 100.

In some embodiments, components of hyper-automation system 100, such as designer application(s) and/or an external rules engine, provide support for managing and enforcing governance policies for controlling various functionality provided by hyper-automation system 100. Governance is the ability for organizations to put policies in place to prevent users from developing automations (e.g., RPA robots) capable of taking actions that may harm the organization, such as violating the E.U. General Data Protection Regulation (GDPR), the U.S. Health Insurance Portability and Accountability Act (HIPAA), third party application terms of service, etc. Since developers may otherwise create automations that violate privacy laws, terms of service, etc. while performing their automations, some embodiments implement access control and governance restrictions at the robot and/or robot design application level. This may provide an added level of security and compliance to the automation process development pipeline in some embodiments by preventing developers from taking dependencies on unapproved software libraries that may either introduce security risks or work in a way that violates policies, regulations, privacy laws, and/or privacy policies. See, for example, U.S. Pat. No. 11,733,668, which is hereby incorporated by reference in its entirety.

The management functionality may provide management, deployment, and optimization of automations across an organization. The management functionality may include orchestration, test management, AI functionality, and/or insights in some embodiments. Management functionality of hyper-automation system 100 may also act as an integration point with third-party solutions and applications for automation applications and/or RPA robots. The management capabilities of hyper-automation system 100 may include, but are not limited to, facilitating provisioning, deployment, configuration, queuing, monitoring, logging, and interconnectivity of RPA robots, among other things.

A conductor application, such as UiPath Orchestrator™ (which may be provided as part of the UiPath Automation Cloud™ in some embodiments, or on premises, in VMs, in a private or public cloud, in a Linux™ VM, or as a cloud native single container suite via UiPath Automation Suite™), provides orchestration capabilities to deploy, monitor, optimize, scale, and ensure security of RPA robot deployments. A test suite (e.g., UiPath Test Suite™) may provide test management to monitor the quality of deployed automations. The test suite may facilitate test planning and execution, meeting of requirements, and defect traceability. The test suite may include comprehensive test reporting.

Analytics software (e.g., UiPath Insights™) may track, measure, and manage the performance of deployed automations. The analytics software may align automation operations with specific key performance indicators (KPIs) and strategic outcomes for an organization. The analytics software may present results in a dashboard format for better understanding by human users.

A data service (e.g., UiPath Data Service™) may be stored in database 140, for example, and bring data into a single, scalable, secure place with a drag-and-drop storage interface. Some embodiments may provide low-code or no-code data modeling and storage to automations while ensuring seamless access, enterprise-grade security, and scalability of the data. AI functionality may be provided by an AI center (e.g., UiPath AI Center™), which facilitates incorporation of AI/ML models into automations. Pre-built AI/ML models, model templates, and various deployment options may make such functionality accessible even to those who are not data scientists. Deployed automations (e.g., RPA robots) may call AI/ML models from the AI center, such as AI/ML models 132. Performance of the AI/ML models may be monitored, and be trained and improved using human-validated data, such as that provided by data review center 160. Human reviewers may provide labeled data to core hyper-automation system 120 via a review application 152 on computing systems 154. For instance, human reviewers may validate that predictions by AI/ML models 132 and/or generative AI models 172 are accurate or provide corrections otherwise. This dynamic input may then be saved as training data for retraining AI/ML models 132 and/or generative AI models 172, and may be stored in a database such as database 140, for example. The AI center may then schedule and execute training jobs to train the new versions of the AI/ML models using the training data. Both positive and negative examples may be stored and used for retraining of AI/ML models 132 and/or generative AI models 172.

The engagement functionality engages humans and automations as one team for seamless collaboration on desired processes. Low-code applications may be built (e.g., via UiPath Apps™) to connect browser tabs and legacy software, even that lacking APIs in some embodiments. Applications may be created quickly using a web browser through a rich library of drag-and-drop controls, for instance. An application can be connected to a single automation or multiple automations.

An action center (e.g., UiPath Action Center™) provides a straightforward and efficient mechanism to hand off processes from automations to humans, and vice versa. Humans may provide approvals or escalations, make exceptions, etc. The automation may then perform the automatic functionality of a given workflow.

A local assistant may be provided as a launchpad for users to launch automations (e.g., UiPath Assistant™). This functionality may be provided in a tray provided by an operating system, for example, and may allow users to interact with RPA robots and RPA robot-powered applications on their computing systems. An interface may list automations approved for a given user and allow the user to run them. These may include ready-to-go automations from an automation marketplace, an internal automation store in an automation hub, etc. When automations run, they may run as a local instance in parallel with other processes on the computing system so users can use the computing system while the automation performs its actions. In certain embodiments, the assistant is integrated with the task capture functionality such that users can document their soon-to-be-automated processes from the assistant launchpad.

Chatbots (e.g., UiPath Chatbots™), social messaging applications, an/or voice commands may enable users to run automations. This may simplify access to information, tools, and resources users need in order to interact with customers or perform other activities. Conversations between people may be readily automated, as with other processes. Trigger RPA robots kicked off in this manner may perform operations such as checking an order status, posting data in a CRM, etc., potentially using plain language commands.

End-to-end measurement and government of an automation program at any scale may be provided by hyper-automation system 100 in some embodiments. Per the above, analytics may be employed to understand the performance of automations (e.g., via UiPath Insights™). Data modeling and analytics using any combination of available business metrics and operational insights may be used for various automated processes. Custom-designed and pre-built dashboards allow data to be visualized across desired metrics, new analytical insights to be discovered, performance indicators to be tracked, ROI to be discovered for automations, telemetry monitoring to be performed on user computing systems, errors and anomalies to be detected, and automations to be debugged. An automation management console (e.g., UiPath Automation Ops™) may be provided to manage automations throughout the automation lifecycle. An organization may govern how automations are built, what users can do with them, and which automations users can access.

Hyper-automation system 100 provides an iterative platform in some embodiments. Processes can be discovered, automations can be built, tested, and deployed, performance may be measured, use of the automations may readily be provided to users, feedback may be obtained, AI/ML models may be trained and retrained, and the process may repeat itself. This facilitates a more robust and effective suite of automations.

In some embodiments, generative AI models are used. Generative AI can generate various types of content, such as text, imagery, audio, and synthetic data. Various types of generative AI models may be used, including, but not limited to, LLMs, generative adversarial networks (GANs), variational autoencoders (VAEs), transformers, etc. These models may be part of AI/ML models 132 hosted on server 130. For instance, the generative AI models may be trained on a large corpus of textual information to perform semantic understanding, to understand the nature of what is present on a screen from text, to automatically generate code, and the like. In certain embodiments, generative AI models 172 provided by an existing cloud ML service provider, such as OpenAIR, Google®, Amazon®, Microsoft®, IBM®, Nvidia®, Facebook®, etc., may be employed and trained to provide such functionality. In generative AI embodiments where generative AI model(s) 172 are remotely hosted, server 130 can be configured to integrate with third-party APIs, which allow server 130 to send a request to generative AI model(s) 172 including the requisite input information and receive a response in return (e.g., the semantic matches of fields between application versions, a classification of the type of the application on the screen, etc.). Such embodiments may provide a more advanced and sophisticated user experience, as well as provide access to state-of-the-art NLP and other ML capabilities that these companies offer.

One aspect of generative AI models in some embodiments is the use of transfer learning. In transfer learning, a pretrained generative AI model, such as an LLM, is fine-tuned on a specific task or domain. This allows the LLM to leverage the knowledge already learned during its initial training and adapt it to a specific application. In the case of LLMs, the pretraining phase involves training an LLM on a large corpus of text, typically consisting of billions of words. During this phase, the LLM learns the relationships between words and phrases, which enables the LLM to generate coherent and human-like responses to text-based inputs. The output of this pretraining phase is an LLM that has a high level of understanding of the underlying patterns in natural language.

In the fine-tuning phase, the pretrained LLM is adapted to a specific task or domain by training the LLM on a smaller dataset that is specific to the task. For instance, in some embodiments, the LLM may be trained to analyze a certain type or multiple types of data sources to improve its accuracy with respect to their content. Such information may be provided as part of the training data, and the LLM may learn to focus on these areas and more accurately identify data elements therein. Fine-tuning allows the LLM to learn the nuances of the task or domain, such as the specific vocabulary and syntax used in that domain, without requiring as much data as would be necessary to train an LLM from scratch. By leveraging the knowledge learned in the pretraining phase, the fine-tuned LLM can achieve state-of-the-art performance on specific tasks with a relatively small amount of training data.

LLMs may be trained using a vector database. Vector databases index, store, and provide access to structured or unstructured data (e.g., text, images, time series data, etc.) alongside the vector embeddings thereof. Data such as text may be tokenized, where single letters, words, or sequences of words are parsed from the text into tokens. These tokens are then "embedded" into vector embeddings, which are the numerical representations of this data. Vector databases allow users to find and retrieve similar objects quickly and at scale in production environments.

AI and ML allow unstructured data to be numerically represented without losing the semantic meaning thereof in vector embeddings. A vector embedding is a long list of numbers, each describing a feature of the data object that the vector embedding represents. Similar objects are grouped together in the vector space. In other words, the more similar the objects are, the closer that the vector embeddings representing the objects will be to one another. Similar objects may be found using a vector search, similarity search, or semantic search. The distance between the vector embeddings may be calculated using various techniques including, but not limited to, squared Euclidean or L2-squared distance, Manhattan or L1 distance, cosine similarity, dot product, Hamming distance, etc. It may be beneficial to select the same metric that is used to train the AI/ML model.

Vector indexing may be used to organize vector embeddings so data can be retrieved efficiently. Calculating the distance between a vector embedding and all other vector embeddings in the vector database using the k-Nearest Neighbors (kNN) algorithm can be computationally expensive if there are a large number of data points since the required calculations increase linearly (O (n)) with the dimensionality and the number of data points. It is more efficient to find similar objects using an approximate nearest neighbor (ANN) approach. The distances between the vector embeddings are pre-calculated, and similar vectors are organized and stored close to one another (e.g., in clusters or a graph) similar objects can be found faster. This process is called "vector indexing." ANN algorithms that may be used in some embodiments include, but are not limited to, clustering-based indexing, proximity graph-based indexing, tree-based indexing, hash-based indexing, compression-based indexing, etc.

Figure 2:
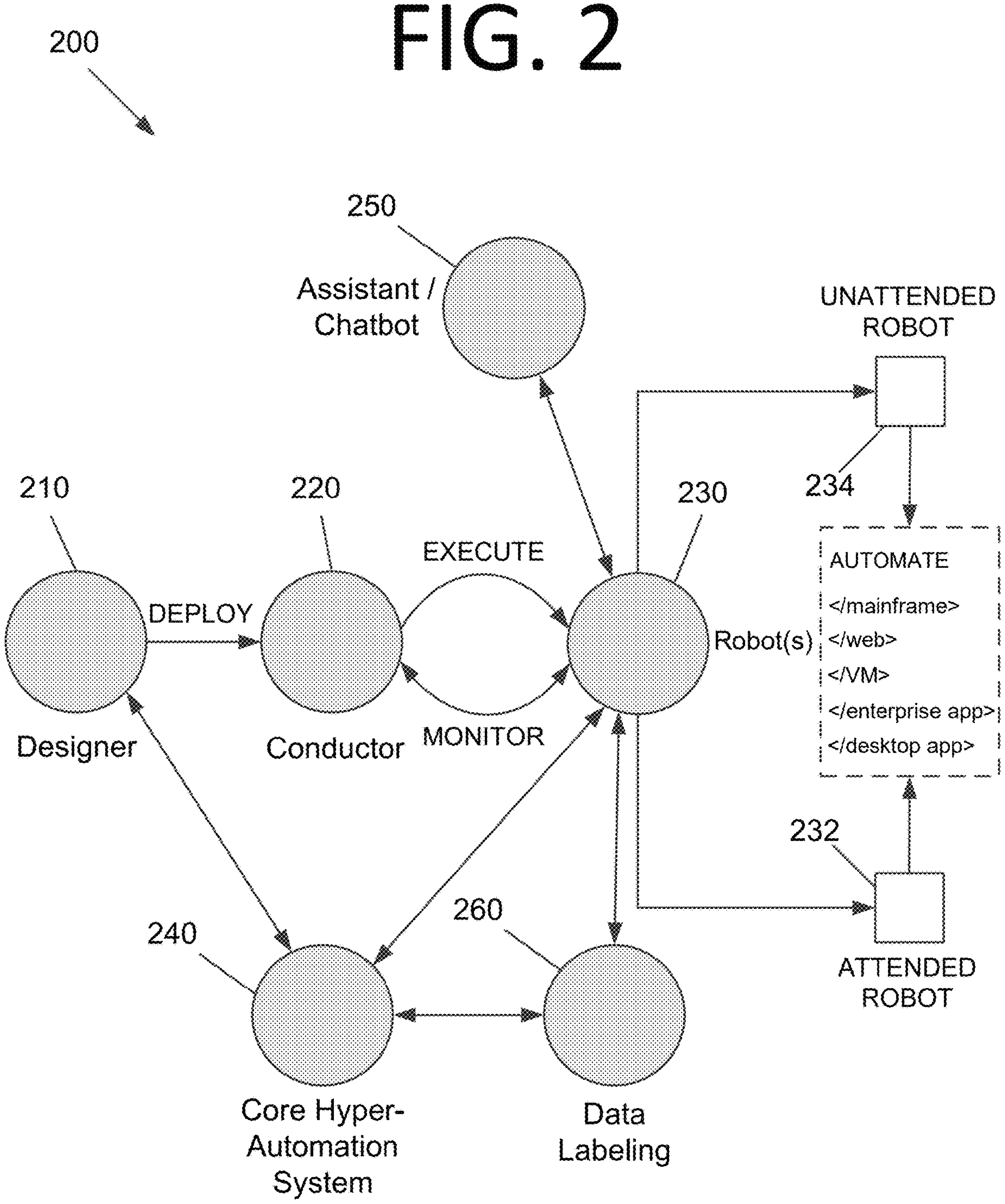
FIG. 2 is an architectural diagram illustrating an RPA system, according to an embodiment of the present invention.

FIG. 2 is an architectural diagram illustrating an RPA system 200, according to an embodiment of the present invention. In some embodiments, RPA system 200 is part of hyper-automation system 100 of FIG. 1. RPA system 200 includes a designer 210 that allows a developer to design and implement workflows. Designer 210 may provide a solution for application integration, as well as automating third-party applications, administrative Information Technology (IT) tasks, and business IT processes. Designer 210 may facilitate development of an automation project, which is a graphical representation of a business process. Simply put, designer 210 facilitates the development and deployment of workflows and robots. In some embodiments, designer 210 may be an application that runs on a user's desktop, an application that runs remotely in a VM, a web application, etc.

The automation project enables automation of rule-based processes by giving the developer control of the execution order and the relationship between a custom set of steps developed in a workflow, defined herein as "activities" per the above. One commercial example of an embodiment of designer 210 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 210, execution of business processes is orchestrated by conductor 220, which orchestrates one or more robots 230 that execute the workflows developed in designer 210. One commercial example of an embodiment of conductor 220 is UiPath Orchestrator™. Conductor 220 facilitates management of the creation, monitoring, and deployment of resources in an environment. Conductor 220 may act as an integration point with third-party solutions and applications. Per the above, in some embodiments, conductor 220 may be part of core hyper-automation system 120 of FIG. 1.

Conductor 220 may manage a fleet of robots 230, connecting and executing robots 230 from a centralized point. Types of robots 230 that may be managed include, but are not limited to, attended robots 232, unattended robots 234, development robots (similar to unattended robots 234, but used for development and testing purposes), and nonproduction robots (similar to attended robots 232, but used for development and testing purposes). Attended robots 232 are triggered by user events and operate alongside a human on the same computing system. Attended robots 232 may be used with conductor 220 for a centralized process deployment and logging medium. Attended robots 232 may help the human user accomplish various tasks, and may be triggered by user events. In some embodiments, processes cannot be started from conductor 220 on this type of robot and/or they cannot run under a locked screen. In certain embodiments, attended robots 232 can only be started from a robot tray or from a command prompt. Attended robots 232 should run under human supervision in some embodiments.

Unattended robots 234 run unattended in virtual environments and can automate many processes. Unattended robots 234 may be responsible for remote execution, monitoring, scheduling, and providing support for work queues. Debugging for all robot types may be run in designer 210 in some embodiments. Both attended and unattended robots may automate various systems and applications including, but not limited to, mainframes, web applications, VMs, enterprise applications (e.g., those produced by SAP®, Salesforce®, Oracle®, etc.), and computing system applications (e.g., desktop and laptop applications, mobile device applications, wearable computer applications, etc.).

Conductor 220 may have various capabilities including, but not limited to, provisioning, deployment, configuration, queueing, monitoring, logging, and/or providing interconnectivity. Provisioning may include creating and maintenance of connections between robots 230 and conductor 220 (e.g., a web application). Deployment may include assuring the correct delivery of package versions to assigned robots 230 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., a structured query language (SQL) database or a "not only" SQL (NoSQL) database) and/or another storage mechanism (e.g., ElasticSearch® which provides the ability to store and quickly query large datasets). Conductor 220 may provide interconnectivity by acting as the centralized point of communication for third-party solutions and/or applications.

Robots 230 are execution agents that implement workflows built in designer 210. One commercial example of some embodiments of robot(s) 230 is UiPath Robots™. In some embodiments, robots 230 install the Microsoft Windows® Service Control Manager (SCM)-managed service by default. As a result, such robots 230 can open interactive Windows® sessions under the local system account, and have the rights of a Windows® service.

In some embodiments, robots 230 can be installed in a user mode. For such robots 230, this means they have the same rights as the user under which a given robot 230 has been installed. This feature may also be available for High Density (HD) robots, which ensure full utilization of each machine at its maximum potential. In some embodiments, any type of robot 230 may be configured in an HD environment.

Robots 230 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 220 and the execution hosts (i.e., the computing systems on which robots 230 are executed). These services are trusted with and manage the credentials for robots 230. A console application is launched by the SCM under the local system.

User mode robot services in some embodiments manage and monitor Windows® sessions and act as a proxy between conductor 220 and the execution hosts. User mode robot services may be trusted with and manage the credentials for robots 230. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 230 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 210 may also be independent of browser zoom level in some embodiments. For applications that are DPI-unaware or intentionally marked as unaware, DPI may be disabled in some embodiments.

RPA system 200 in this embodiment is part of a hyper-automation system. Developers may use designer 210 to build and test RPA robots that utilize AI/ML models deployed in core hyper-automation system 240 (e.g., as part of an AI center thereof). Such RPA robots may send input for execution of the AI/ML model(s) and receive output therefrom via core hyper-automation system 240.

One or more of robots 230 may be listeners, as described above. These listeners may provide information to core hyper-automation system 240 regarding what users are doing when they use their computing systems. This information may then be used by core hyper-automation system for process mining, task mining, task capture, etc.

An assistant/chatbot 250 may be provided on user computing systems to allow users to launch RPA local robots. The assistant may be located in a system tray, for example. Chatbots may have a user interface so users can see text in the chatbot. Alternatively, chatbots may lack a user interface and run in the background, listening using the computing system's microphone for user speech.

In some embodiments, data labeling may be performed by a user of the computing system on which a robot is executing or on another computing system that the robot provides information to. For instance, if a robot calls an AI/ML model that performs CV on images for VM users, but the AI/ML model does not correctly identify a button on the screen, the user may draw a rectangle around the misidentified or non-identified component and potentially provide text with a correct identification. This information may be provided to core hyper-automation system 240 and then used later for training a new version of the AI/ML model.

Figure 3:
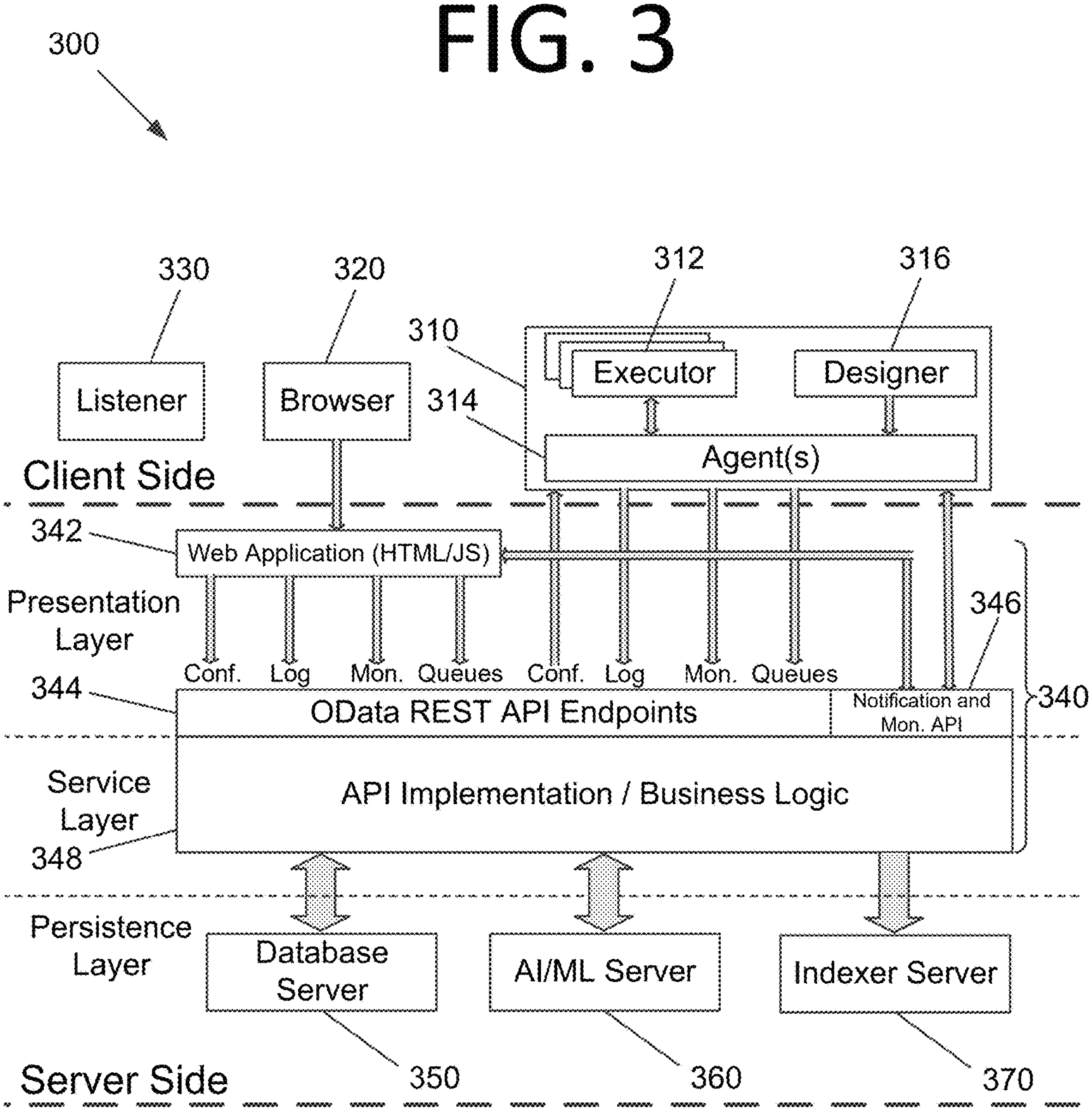
FIG. 3 is an architectural diagram illustrating a deployed RPA system, according to an embodiment of the present invention.

FIG. 3 is an architectural diagram illustrating a deployed RPA system 300, according to an embodiment of the present invention. In some embodiments, RPA system 300 may be a part of RPA system 200 of FIG. 2 and/or hyper-automation system 100 of FIG. 1. Deployed RPA system 300 may be a cloud-based system, an on-premises system, a desktop-based system that offers enterprise level, user level, or device level automation solutions for automation of different computing processes, etc.

It should be noted that the client side, the server side, or both, may include any desired number of computing systems without deviating from the scope of the invention. On the client side, a robot application 310 includes executors 312, an agent 314, and a designer 316. However, in some embodiments, designer 316 may not be running on the same computing system as executors 312 and agent 314. Executors 312 are running processes. Several business projects may run simultaneously, as shown in FIG. 3. Agent 314 (e.g., a Windows® service) is the single point of contact for all executors 312 in this embodiment. All messages in this embodiment are logged into conductor 340, which processes them further via database server 350, an AI/ML server 360, an indexer server 370, or any combination thereof. As discussed above with respect to FIG. 2, executors 312 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 314 is also responsible for sending the status of the robot (e.g., periodically sending a "heartbeat" message indicating that the robot is still functioning) and downloading the required version of the package to be executed. The communication between agent 314 and conductor 340 is always initiated by agent 314 in some embodiments. In the notification scenario, agent 314 may open a WebSocket channel that is later used by conductor 340 to send commands to the robot (e.g., start, stop, etc.).

A listener 330 monitors and records data pertaining to user interactions with an attended computing system and/or operations of an unattended computing system on which listener 330 resides. Listener 330 may be an RPA robot, part of an operating system, a downloadable application for the respective computing system, or any other software and/or hardware without deviating from the scope of the invention. Indeed, in some embodiments, the logic of the listener is implemented partially or completely via physical hardware.

On the server side, a presentation layer (web application 342, Open Data Protocol (OData) Representative State Transfer (REST) Application Programming Interface (API) endpoints 344, and notification and monitoring 346), a service layer (API implementation/business logic 348), and a persistence layer (database server 350, AI/ML server 360, and indexer server 370) are included. Conductor 340 includes web application 342, Odata REST API endpoints 344, notification and monitoring 346, and API implementation/business logic 348. In some embodiments, most actions that a user performs in the interface of conductor 340 (e.g., via browser 320) are performed by calling various APIs. Such actions may include, but are not limited to, starting jobs on robots, adding/removing data in queues, scheduling jobs to run unattended, etc. without deviating from the scope of the invention. Web application 342 is the visual layer of the server platform. In this embodiment, web application 342 uses Hypertext Markup Language (HTML) and JavaScript (JS). However, any desired markup languages, script languages, or any other formats may be used without deviating from the scope of the invention. The user interacts with web pages from web application 342 via browser 320 in this embodiment in order to perform various actions to control conductor 340. For instance, the user may create robot groups, assign packages to the robots, analyze logs per robot and/or per process, start and stop robots, etc.

In addition to web application 342, conductor 340 also includes service layer that exposes Odata REST API endpoints 344. However, other endpoints may be included without deviating from the scope of the invention. The REST API is consumed by both web application 342 and agent 314. Agent 314 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 340. Queueing REST endpoints may be responsible for queues and queue item management, such as adding data to a queue, obtaining a transaction from the queue, setting the status of a transaction, etc.

Monitoring REST endpoints may monitor web application 342 and agent 314. Notification and monitoring API 346 may be REST endpoints that are used for registering agent 314, delivering configuration settings to agent 314, and for sending/receiving notifications from the server and agent 314. Notification and monitoring API 346 may also use WebSocket communication in some embodiments.

The APIs in the service layer may be accessed through configuration of an appropriate API access path in some embodiments, e.g., based on whether conductor 340 and an overall hyper-automation system have an on-premises deployment type or a cloud-based deployment type. APIs for conductor 340 may provide custom methods for querying stats about various entities registered in conductor 340. Each logical resource may be an Odata entity in some embodiments. In such an entity, components such as the robot, process, queue, etc., may have properties, relationships, and operations. APIs of conductor 340 may be consumed by web application 342 and/or agents 314 in two ways in some embodiments: by getting the API access information from conductor 340, or by registering an external application to use the Oauth flow.

The persistence layer includes a trio of servers in this embodiment-database server 350 (e.g., a SQL server), AI/ML server 360 (e.g., a server providing AI/ML model serving services, such as AI center functionality) and indexer server 370. Database server 350 in this embodiment stores the configurations of the robots, robot groups, associated processes, users, roles, schedules, etc. This information is managed through web application 342 in some embodiments. Database server 350 may manage queues and queue items. In some embodiments, database server 350 may store messages logged by the robots (in addition to or in lieu of indexer server 370). Database server 350 may also store process mining, task mining, and/or task capture-related data, received from listener 330 installed on the client side, for example. While no arrow is shown between listener 330 and database 350, it should be understood that listener 330 is able to communicate with database 350, and vice versa in some embodiments. This data may be stored in the form of PDDs, images, XAML files, etc. Listener 330 may be configured to intercept user actions, processes, tasks, and performance metrics on the respective computing system on which listener 330 resides. For example, listener 330 may record user actions (e.g., clicks, typed characters, locations, applications, active elements, times, etc.) on its respective computing system and then convert these into a suitable format to be provided to and stored in database server 350.

AI/ML server 360 facilitates incorporation of AI/ML models into automations. Pre-built AI/ML models, model templates, and various deployment options may make such functionality accessible even to those who are not data scientists. Deployed automations (e.g., RPA robots) may call AI/ML models from AI/ML server 360. Performance of the AI/ML models may be monitored, and be trained and improved using human-validated data. AI/ML server 360 may schedule and execute training jobs to train new versions of the AI/ML models.

AI/ML server 360 may store data pertaining to AI/ML models and ML packages for configuring various ML skills for a user at development time. An ML skill, as used herein, is a pre-built and trained ML model for a process, which may be used by an automation, for example. AI/ML server 360 may also store data pertaining to document understanding technologies and frameworks, algorithms and software packages for various AI/ML capabilities including, but not limited to, intent analysis, NLP, speech analysis, different types of AI/ML models, etc.

Indexer server 370, which is optional in some embodiments, stores and indexes the information logged by the robots. In certain embodiments, indexer server 370 may be disabled through configuration settings. In some embodiments, indexer server 370 uses ElasticSearch®, which is an open source project full-text search engine. Messages logged by robots (e.g., using activities like log message or write line) may be sent through the logging REST endpoint(s) to indexer server 370, where they are indexed for future utilization.

Figure 4:
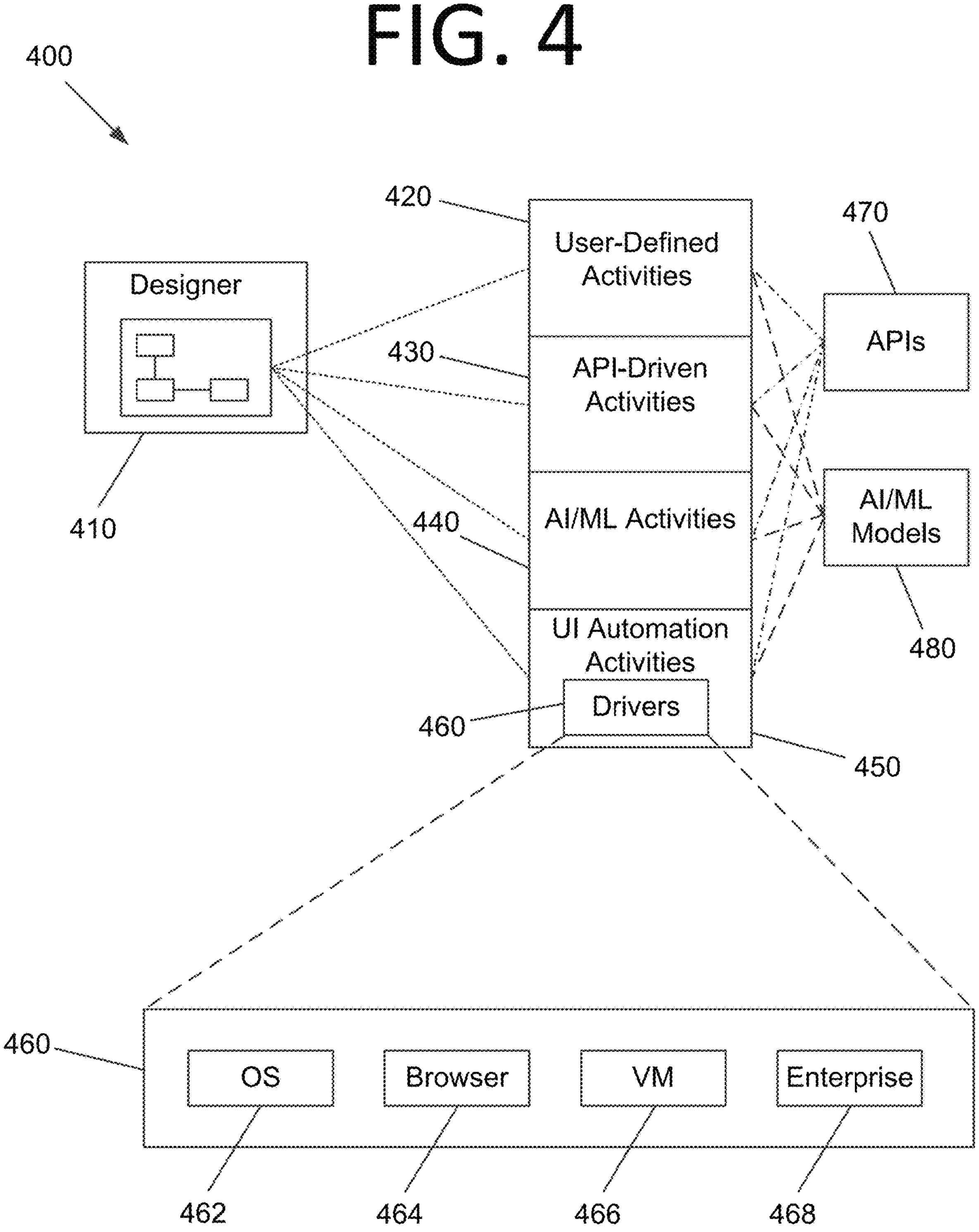
FIG. 4 is an architectural diagram illustrating the relationship between a designer, activities, and drivers, according to an embodiment of the present invention.

FIG. 4 is an architectural diagram illustrating the relationship 400 between a designer 410, activities 420, 430, 440, 450, drivers 460, APIs 470, and AI/ML models 480, according to an embodiment of the present invention. Per the above, a developer uses designer 410 to develop workflows that are executed by robots. The various types of activities may be displayed to the developer in some embodiments. Designer 410 may be local to the user's computing system or remote thereto (e.g., accessed via VM or a local web browser interacting with a remote web server). Workflows may include user-defined activities 420, API-driven activities 430, AI/ML activities 440, and/or UI automation activities 450. User-defined activities 420 and API-driven activities 440 interact with applications via their APIs. User-defined activities 420 and/or AI/ML activities 440 may call one or more AI/ML models 480 in some embodiments, which may be located locally to the computing system on which the robot is operating and/or remotely thereto.

Some embodiments are able to identify non-textual visual components in an image, which is called CV herein. However, it should be noted that in some embodiments, CV incorporates OCR. CV may be performed at least in part by AI/ML model(s) 480. Some CV activities pertaining to such components may include, but are not limited to, extracting of text from segmented label data using OCR, fuzzy text matching, cropping of segmented label data using ML, comparison of extracted text in label data with ground truth data, etc. In some embodiments, there may be hundreds or even thousands of activities that may be implemented in user-defined activities 420. However, any number and/or type of activities may be used without deviating from the scope of the invention.

UI automation activities 450 are a subset of special, lower-level activities that are written in lower-level code and facilitate interactions with the screen. UI automation activities 450 facilitate these interactions via drivers 460 that allow the robot to interact with the desired software. For instance, drivers 460 may include operating system (OS) drivers 462, browser drivers 464, VM drivers 466, enterprise application drivers 468, etc. One or more of AI/ML models 480 may be used by UI automation activities 450 in order to perform interactions with the computing system in some embodiments. In certain embodiments, AI/ML models 480 may augment drivers 460 or replace them completely. Indeed, in certain embodiments, drivers 460 are not included.

Drivers 460 may interact with the OS at a low level looking for hooks, monitoring for keys, etc. via OS drivers 462. Drivers 460 may facilitate integration with Chrome®, IER, Citrix®, SAP®, etc. For instance, the "click" activity performs the same role in these different applications via drivers 460.

Figure 5:
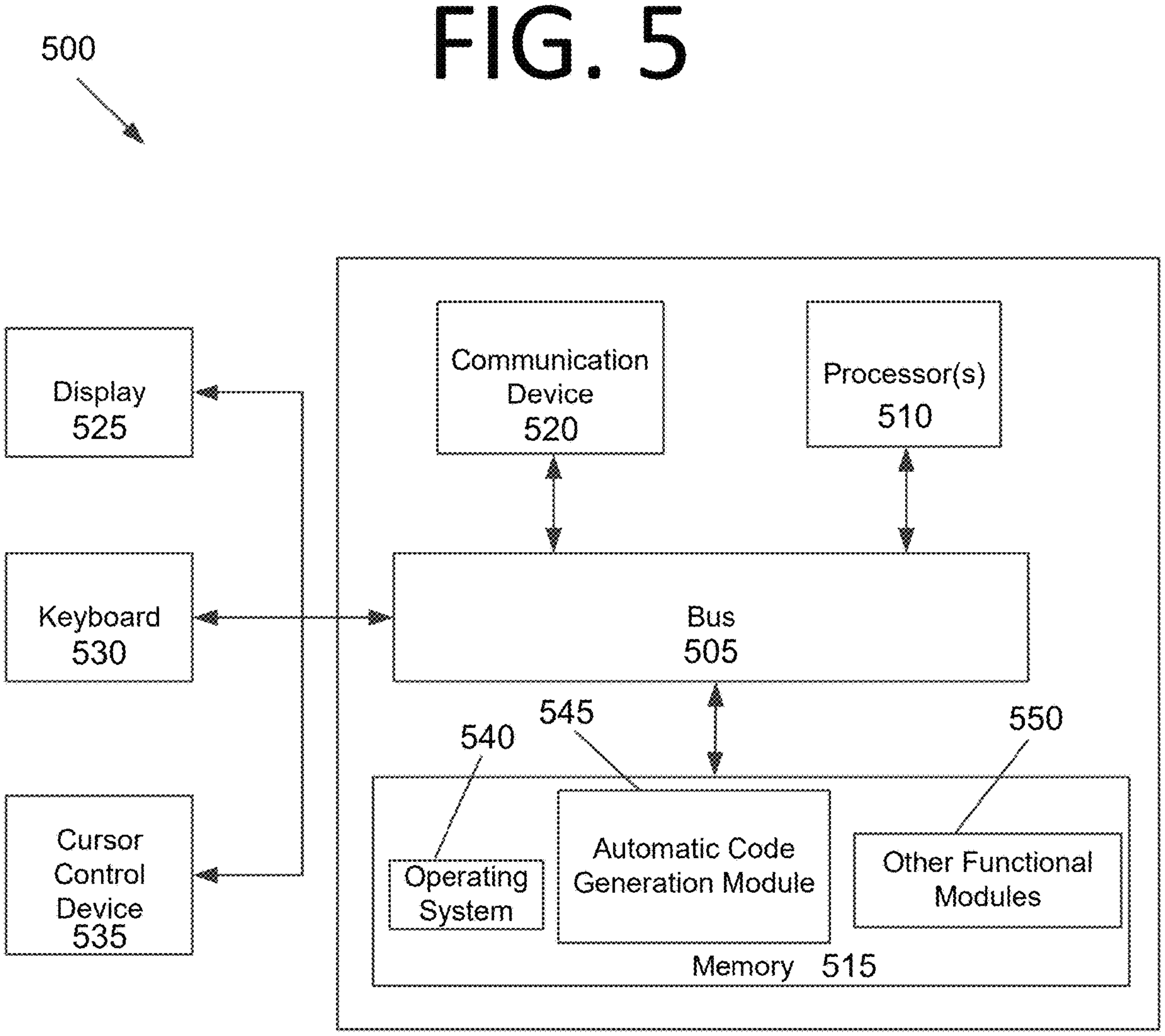
FIG. 5 is an architectural diagram illustrating a computing system configured to perform automatic code generation for RPA, according to an embodiment of the present invention.

FIG. 5 is an architectural diagram illustrating a computing system 500 configured to perform automatic code generation for RPA, according to an embodiment of the present invention. In some embodiments, computing system 500 may be one or more of the computing systems depicted and/or described herein. In certain embodiments, computing system 500 may be part of a hyper-automation system, such as that shown in FIGS. 1 and 2. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both. Computing system 500 includes a communication device 520, such as a transceiver, to provide access to a communications network via a wireless and/or wired connection. In some embodiments, communication device 520 may include one or more antennas that are singular, arrayed, phased, switched, beamforming, beamsteering, a combination thereof, and/or any other antenna configuration without deviating from the scope of the invention.

Processor(s) 510 are further coupled via bus 505 to a display 525. Any suitable display device and haptic I/O may be used without deviating from the scope of the invention. A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include an automatic code generation module 545 that is configured to perform all or part of the AI/ML processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6A:
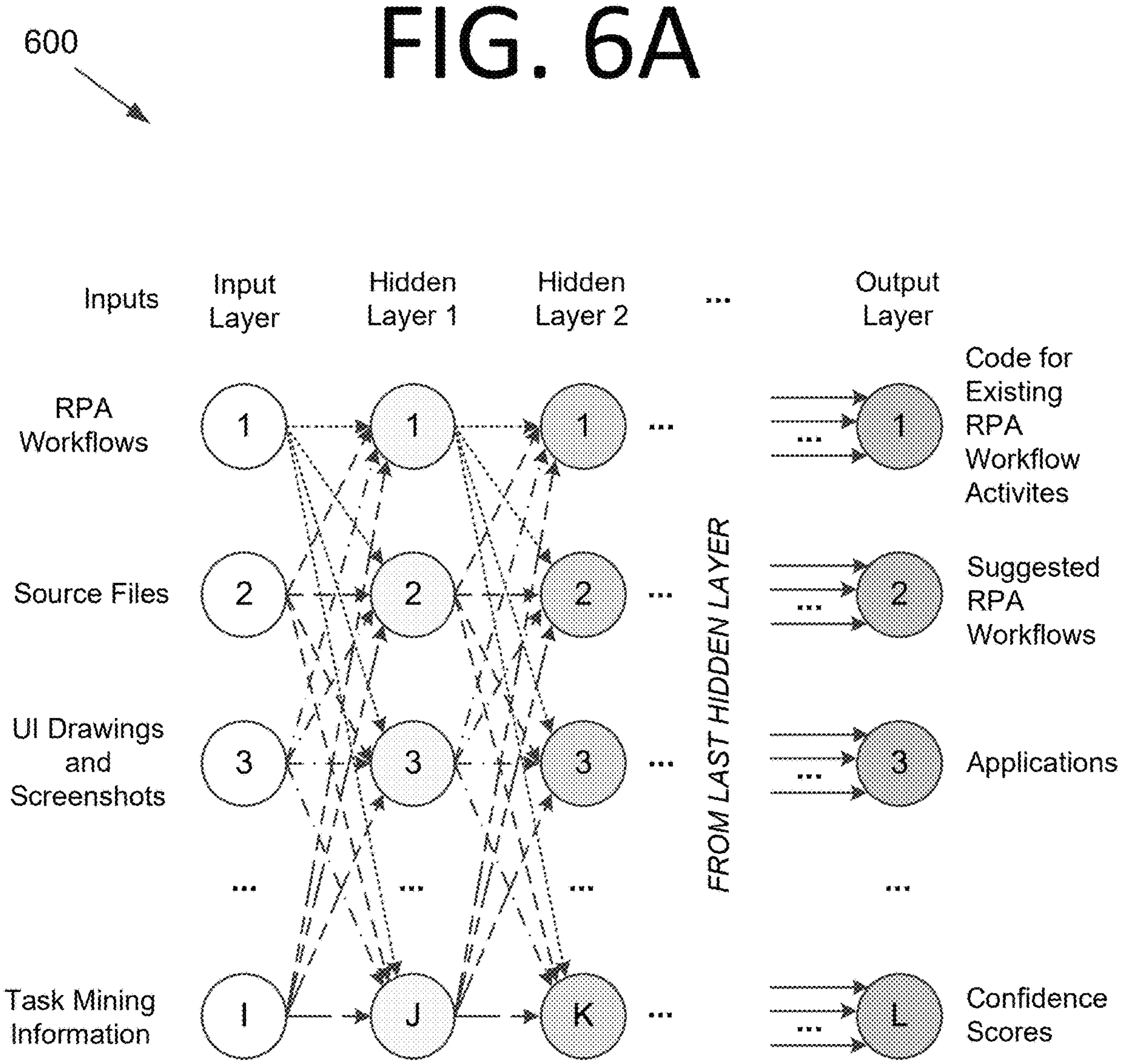
FIG. 6A illustrates an example of a neural network that has been trained to supplement automatic code generation for RPA, according to an embodiment of the present invention.

Various types of AI/ML models may be trained and deployed without deviating from the scope of the invention. For instance, FIG. 6A illustrates an example of a neural network 600 that has been trained to supplement automatic code generation for RPA, according to an embodiment of the present invention. Neural network 600 includes a number of hidden layers. Both DLNNs and shallow learning neural networks (SLNNs) usually have multiple layers, although SLNNs may only have one or two layers in some cases, and normally fewer than DLNNs. Typically, the neural network architecture includes an input layer, multiple intermediate layers, and an output layer, as is the case in neural network 600.

A DLNN often has many layers (e.g., 10, 50, 200, etc.) and subsequent layers typically reuse features from previous layers to compute more complex, general functions. A SLNN, on the other hand, tends to have only a few layers and train relatively quickly since expert features are created from raw data samples in advance. However, feature extraction is laborious. DLNNs, on the other hand, usually do not require expert features, but tend to take longer to train and have more layers.

For both approaches, the layers are trained simultaneously on the training set, normally checking for overfitting on an isolated cross-validation set. Both techniques can yield excellent results, and there is considerable enthusiasm for both approaches. The optimal size, shape, and quantity of individual layers varies depending on the problem that is addressed by the respective neural network.

Returning to FIG. 6A, RPA workflows, source files (e.g., PDF documents, PDDs, policies, XAML files, etc.), UI drawings and screenshots, task mining information, etc. are provided as the input layer and fed as inputs to the J neurons of hidden layer 1. Various other inputs are possible, including, but not limited to, computing system state information, published automations, business rules, information regarding what RPA workflows and/or tasks pertain to, initial definitions of automations, process automation documents, etc. While all of these inputs are fed to each neuron in this example, various architectures are possible that may be used individually or in combination including, but not limited to, feed forward networks, radial basis networks, deep feed forward networks, deep convolutional inverse graphics networks, convolutional neural networks, recurrent neural networks, artificial neural networks, long/short term memory networks, gated recurrent unit networks, generative adversarial networks, liquid state machines, auto encoders, variational auto encoders, denoising auto encoders, sparse auto encoders, extreme learning machines, echo state networks, Markov chains, Hopfield networks, Boltzmann machines, restricted Boltzmann machines, deep residual networks, Kohonen networks, deep belief networks, deep convolutional networks, support vector machines, neural Turing machines, or any other suitable type or combination of neural networks without deviating from the scope of the invention.

Hidden layer 2 receives inputs from hidden layer 1, hidden layer 3 receives inputs from hidden layer 2, and so on for all hidden layers until the last hidden layer provides its outputs as inputs for the output layer. While multiple suggestions are shown here as output, in some embodiments, only a single output suggestion is provided. In certain embodiments, the suggestions are ranked based on confidence scores.

It should be noted that numbers of neurons I, J, K, and L are not necessarily equal. Thus, any desired number of layers may be used for a given layer of neural network 600 without deviating from the scope of the invention. Indeed, in certain embodiments, the types of neurons in a given layer may not all be the same.

Neural network 600 is trained to assign confidence score(s) to appropriate outputs. In order to reduce predictions that are inaccurate, only those results with a confidence score that meets or exceeds a confidence threshold may be provided in some embodiments. For instance, if the confidence threshold is 80%, outputs with confidence scores exceeding this amount may be used and the rest may be ignored.

Neural networks are probabilistic constructs that typically have confidence score(s). This may be a score learned by the AI/ML model based on how often a similar input was correctly identified during training. Some common types of confidence scores include a decimal number between 0 and 1 (which can be interpreted as a confidence percentage as well), a number between negative œ and positive ∞, a set of expressions (e.g., "low," "medium," and "high"), etc. Various post-processing calibration techniques may also be employed in an attempt to obtain a more accurate confidence score, such as temperature scaling, batch normalization, weight decay, negative log likelihood (NLL), etc.

"Neurons" in a neural network are implemented algorithmically as mathematical functions that are typically based on the functioning of a biological neuron. Neurons receive weighted input and have a summation and an activation function that governs whether they pass output to the next layer. This activation function may be a nonlinear thresholded activity function where nothing happens if the value is below a threshold, but then the function linearly responds above the threshold (i.e., a rectified linear unit (ReLU) nonlinearity). Summation functions and ReLU functions are used in deep learning since real neurons can have approximately similar activity functions. Via linear transforms, information can be subtracted, added, etc. In essence, neurons act as gating functions that pass output to the next layer as governed by their underlying mathematical function. In some embodiments, different functions may be used for at least some neurons.

Figure 6B:
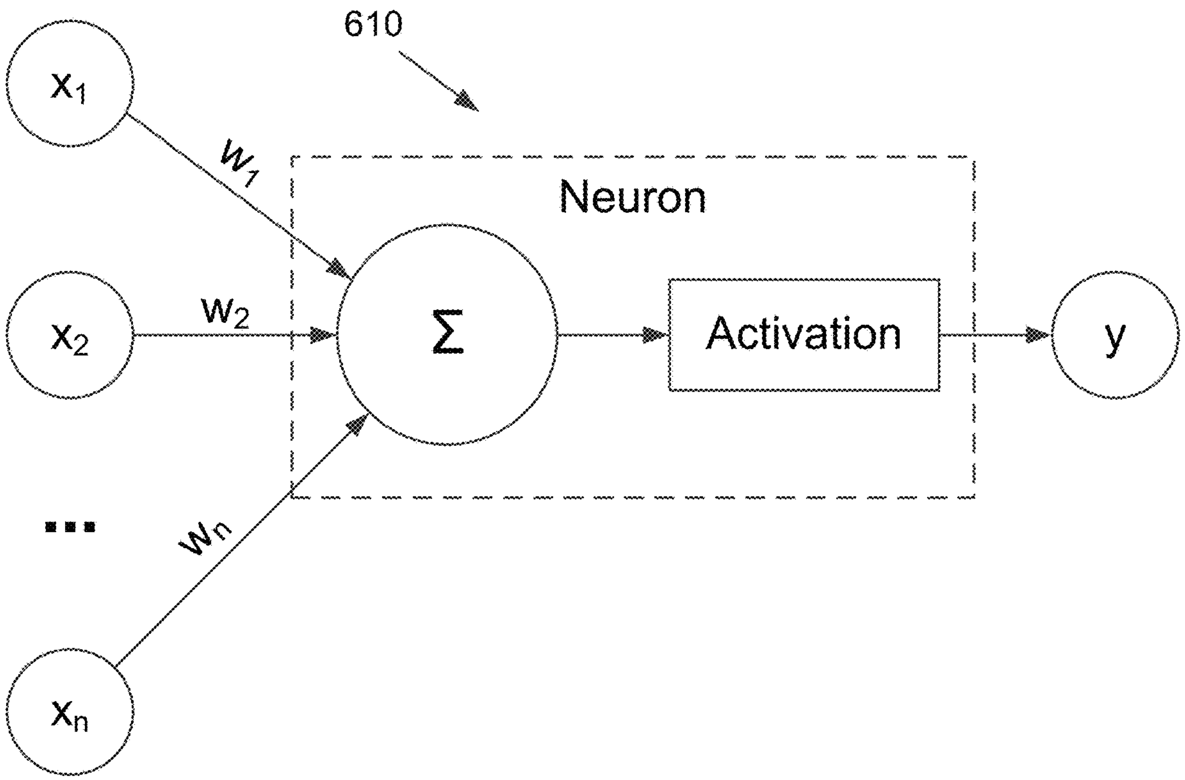
FIG. 6B illustrates an example of a neuron, according to an embodiment of the present invention.

An example of a neuron 610 is shown in FIG. 6B. Inputs $x_1, x_2, \ldots, x_n$ from a preceding layer are assigned respective weights $w_1, w_2, \ldots, w_n$. Thus, the collective input from preceding neuron 1 is $w_1x_1$. These weighted inputs are used for the neuron's summation function modified by a bias, such as:

$$\sum_{i=1}^{m}(w_i x_i) + \text{bias} \tag{1}$$

This summation is compared against an activation function f(x) to determine whether the neuron "fires". For instance, f(x) may be given by:

$$f(x) = \begin{cases} 1 & \text{if } \sum wx + \text{bias} \geq 0 \\ 0 & \text{if } \sum wx + \text{bias} < 0 \end{cases} \tag{2}$$

The output y of neuron 610 may thus be given by:

$$y = f(x)\sum_{i=1}^{m}(w_i x_i) + \text{bias} \tag{3}$$

In this case, neuron 610 is a single-layer perceptron. However, any suitable neuron type or combination of neuron types may be used without deviating from the scope of the invention. It should also be noted that the ranges of values of the weights and/or the output value(s) of the activation function may differ in some embodiments without deviating from the scope of the invention.

A goal, or "reward function," is often employed. A reward function explores intermediate transitions and steps with both short-term and long-term rewards to guide the search of a state space and attempt to achieve a goal (e.g., finding the most accurate answers to user inquiries based on associated metrics). During training, various labeled data is fed through neural network 600. Successful identifications strengthen weights for inputs to neurons, whereas unsuccessful identifications weaken them. A cost function, such as mean square error (MSE) or gradient descent may be used to punish predictions that are slightly wrong much less than predictions that are very wrong. If the performance of the AI/ML model is not improving after a certain number of training iterations, a data scientist may modify the reward function, provide corrections of incorrect predictions, etc.

Backpropagation is a technique for optimizing synaptic weights in a feedforward neural network. Backpropagation may be used to "pop the hood" on the hidden layers of the neural network to see how much of the loss every node is responsible for, and subsequently updating the weights in such a way that minimizes the loss by giving the nodes with higher error rates lower weights, and vice versa. In other words, backpropagation allows data scientists to repeatedly adjust the weights so as to minimize the difference between actual output and desired output.

The backpropagation algorithm is mathematically founded in optimization theory. In supervised learning, training data with a known output is passed through the neural network and error is computed with a cost function from known target output, which gives the error for backpropagation. Error is computed at the output, and this error is transformed into corrections for network weights that will minimize the error.

In the case of supervised learning, an example of backpropagation is provided below. A column vector input x is processed through a series of N nonlinear activity functions $f_i$ between each layer i=1, . . . , N of the network, with the output at a given layer first multiplied by a synaptic matrix $W_i$, and with a bias vector bi added. The network output o, given by $$o = f_N(W_N f_{N-1}(W_{N-1} f_{N-2}( \dots f_1(W_1 x + b_1) \dots ) + b_{N-1}) + b_N) \quad (4)$$

In some embodiments, o is compared with a target output t, resulting in an error $$E = \frac{1}{2}\|o - t\|^2,$$

which is desired to be minimized.

Optimization in the form of a gradient descent procedure may be used to minimize the error by modifying the synaptic weights $W_i$ for each layer. The gradient descent procedure requires the computation of the output o given an input x corresponding to a known target output t, and producing an error o-t. This global error is then propagated backwards giving local errors for weight updates with computations similar to, but not exactly the same as, those used for forward propagation. In particular, the backpropagation step typically requires an activity function of the form $p_j(n_j)=f'_j(n_j)$, where $n_j$ is the network activity at layer j (i.e., $n_j=W_j o_{j-1}+b_j$) where $o_j=f_j(n_j)$ and the apostrophe ' denotes the derivative of the activity function f.

The weight updates may be computed via the formulae:

$$d_j = \begin{cases} (o - t) \circ p_j(n_j), & j = N \\ W_{j+1}^T d_{j+1} \circ p_j(n_j), & j < N \end{cases} \quad (5)$$

$$\frac{\partial E}{\partial W_{j+1}} = d_{j+1}(o_j)^T \quad (6)$$

$$\frac{\partial E}{\partial W_{j+1}} = d_{j+1} \quad (7)$$

-continued $$W_j^{new} = W_j^{old} - \eta \frac{\partial E}{\partial W_j} \quad (8)$$

$$b_j^{new} = b_j^{old} - \eta \frac{\partial E}{\partial b_j} \quad (9)$$

where o denotes a Hadamard product (i.e., the element-wise product of two vectors), T denotes the matrix transpose, and $o_j$ denotes $f_j(W_j o_{j-1}+b_j)$, with $o_0$=x. Here, the learning rate n is chosen with respect to machine learning considerations. Below, n is related to the neural Hebbian learning mechanism used in the neural implementation. Note that the synapses W and b can be combined into one large synaptic matrix, where it is assumed that the input vector has appended ones, and extra columns representing the b synapses are subsumed to W.

The AI/ML model may be trained over multiple epochs until it reaches a good level of accuracy (e.g., 97% or better using an F2 or F4 threshold for detection and approximately 2,000 epochs). This accuracy level may be determined in some embodiments using an F1 score, an F2 score, an F4 score, or any other suitable technique without deviating from the scope of the invention. Once trained on the training data, the AI/ML model may be tested on a set of evaluation data that the AI/ML model has not encountered before. This helps to ensure that the AI/ML model is not "over fit" such that it performs well on the training data, but does not perform well on other data.

In some embodiments, it may not be known what accuracy level is possible for the AI/ML model to achieve. Accordingly, if the accuracy of the AI/ML model is starting to drop when analyzing the evaluation data (i.e., the model is performing well on the training data, but is starting to perform less well on the evaluation data), the AI/ML model may go through more epochs of training on the training data (and/or new training data). In some embodiments, the AI/ML model is only deployed if the accuracy reaches a certain level or if the accuracy of the trained AI/ML model is superior to an existing deployed AI/ML model. In certain embodiments, a collection of trained AI/ML models may be used to accomplish a task. For example, one model may be trained to recognize images, another may recognize text, yet another may recognize semantic and/or ontological associations, etc.

Some embodiments may use transformer networks such as SentenceTransformers™, which is a Python™ framework for state-of-the-art sentence, text, and image embeddings. Such transformer networks learn associations of words and phrases that have both high scores and low scores. This trains the AI/ML model to determine what is close to the input and what is not, respectively. Rather than just using pairs of words/phrases, transformer networks may use the field length and field type, as well.

NLP techniques such as word2vec, BERT, GPT-3, ChatGPT, other LLMs, etc. may be used in some embodiments to facilitate semantic understanding and provide more accurate and human-like answers, per the above. Other techniques, such as clustering algorithms, may be used to find similarities between groups of elements. Clustering algorithms may include, but are not limited to, density-based algorithms, distribution-based algorithms, centroid-based algorithms, hierarchy-based algorithms. K-means clustering algorithms, the DBSCAN clustering algorithm, the Gaussian mixture model (GMM) algorithms, the balance iterative reducing and clustering using hierarchies (BIRCH) algorithm, etc. Such techniques may also assist with categorization.

Figure 7:
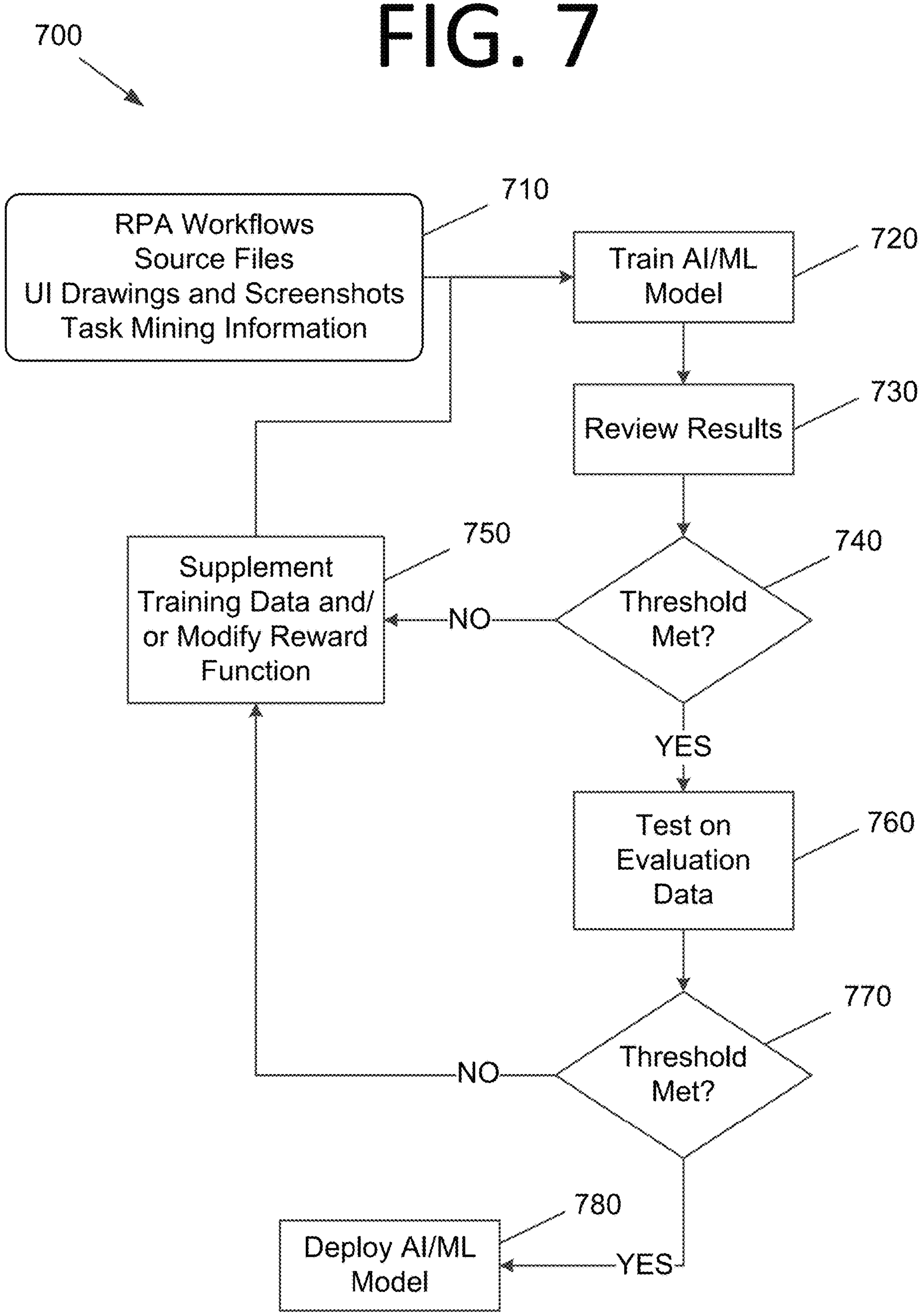
FIG. 7 is a flowchart illustrating a process for training AI/ML model(s), according to an embodiment of the present invention.

FIG. 7 is a flowchart illustrating a process 700 for training AI/ML model(s), according to an embodiment of the present invention. In some embodiments, the AI/ML model(s) may be generative AI models, per the above. The neural network architecture of AI/ML models typically include multiple layers of neurons, including input, output, and hidden layers. See FIGS. 6A and 6B, for example. The hidden layers in between process the input data and generate intermediate representations of the input that are used to generate the output. These hidden layers can include various types of neurons, such as convolutional neurons, recurrent neurons, and/or transformer neurons.

The training process begins with providing RPA workflows, source files, UI drawings and screenshots, task mining information, etc., whether labeled or unlabeled, at 710. The AI/ML model is then trained over multiple epochs at 720 and results are reviewed at 730. While various types of AI/ML models may be used, LLMs and other generative AI models are typically trained using a process called "supervised learning", which is also discussed above. Supervised learning involves providing the model with a large dataset, which the model uses to learn the relationships between the inputs and outputs. During the training process, the model adjusts the weights and biases of the neurons in the neural network to minimize the difference between the predicted outputs and the actual outputs in the training dataset.

One aspect of the models in some embodiments is the use of transfer learning. For instance, transfer learning may take advantage of a pretrained model, such as ChatGPT, which is fine-tuned on a specific task or domain in step 720. This allows the model to leverage the knowledge already learned from the pretraining phase and adapt it to a specific application via the training phase of step 720.

The pretraining phase involves training the model on an initial set of training data that may be more general. During this phase, the model learns relationships in the data. In the fine-tuning phase (e.g., performed during step 720 in addition to or in lieu of the initial training phase in some embodiments if a pretrained model is used as the initial basis for the final model), the pretrained model is adapted to a specific task or domain by training the model on a smaller dataset that is specific to the task. For instance, in some embodiments, the model may be focused on certain types(s) of data sources. This may help the model to more accurately identify data elements therein than a generative AI model that is pretrained alone. Fine-tuning allows the model to learn the nuances of the source, such as the specific vocabulary and syntax, certain graphical characteristics, certain data formats, etc., without requiring as much data as would be necessary to train the model from scratch. By leveraging the knowledge learned in the pretraining phase, the fine-tuned model can achieve state-of-the-art performance on specific tasks with relatively little additional training data.

If the AI/ML model fails to meet a desired confidence threshold at 740, the training data is supplemented and/or the reward function is modified to help the AI/ML model achieve its objectives better at 750 and the process returns to step 720. If the AI/ML model meets the confidence threshold at 740, the AI/ML model is tested on evaluation data at 760 to ensure that the AI/ML model generalizes well and that the AI/ML model is not over fit with respect to the training data. The evaluation data includes information that the AI/ML model has not processed before. If the confidence threshold is met at 770 for the evaluation data, the AI/ML model is deployed at 780. If not, the process returns to step 750 and the AI/ML model is trained further.

Figure 8A:
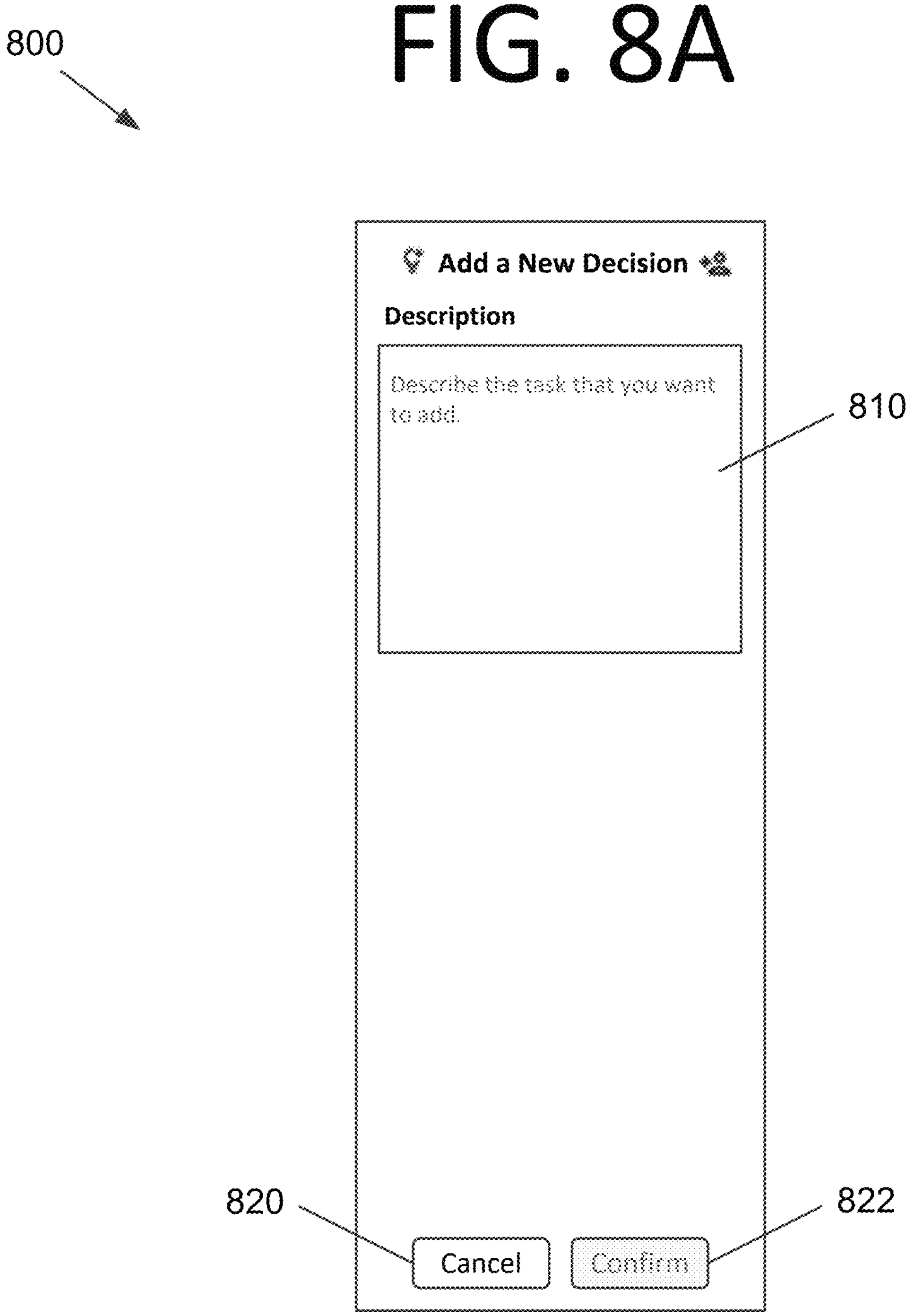
FIGS. 8A-C are screenshots illustrating an automatic code generation interface that is configured to analyze natural language input from a user and propose an automation, according to an embodiment of the present invention.
Figure 8B:
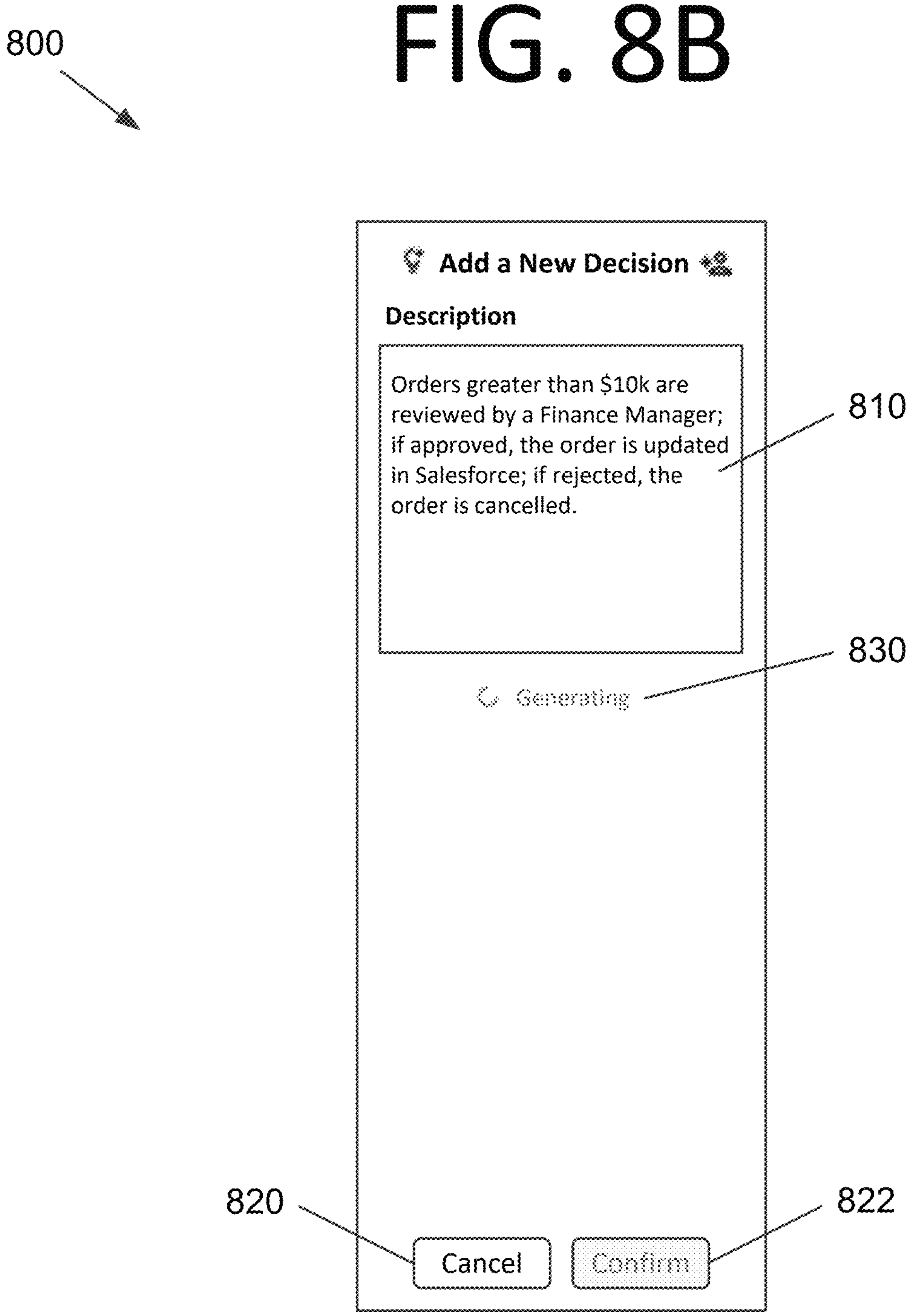
Figure 8C:
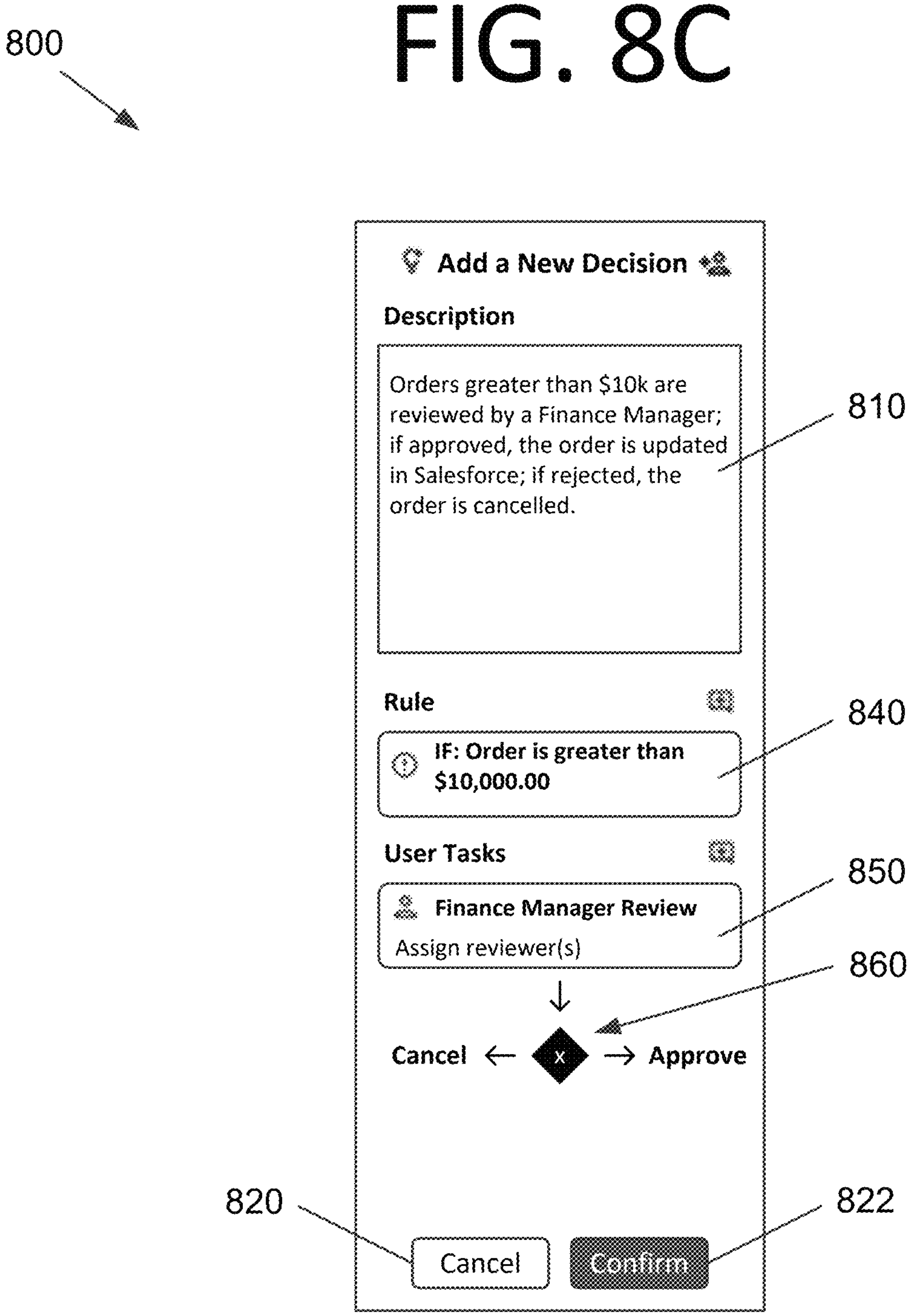

FIGS. 8A-C are screenshots illustrating an automatic code generation interface 800 that is configured to analyze natural language input from a user and propose an automation, according to an embodiment of the present invention. Automatic code generation interface includes a text box 810 where a user can enter text pertaining to a desired task to be automated. Automatic code generation interface 800 also includes a cancel button 820 and a confirm button 822, the latter of which is inactive in FIGS. 8A and 8B.

In FIG. 8B, the user enters text in text box 810 to automate an order review process by a finance manager. Specifically, the user types "Orders greater than $10 k are reviewed by a Finance Manager; if approved, the order is updated in Salesforce; if rejected, the order is cancelled." When the user enters text in text box 810 and presses enter, an automation generation status indicator 830 indicates that the proposed automation is being generated based on the user input.

Turning to FIG. 8C, automatic code generation interface 800 proposes an automation for the requested task. A rule 840 is created for the condition where the order is over $10,000.00. When this condition is met, a finance manager review user task 850 is performed. The assigned reviewer(s) are able to perform review options 860—namely, the reviewer(s) can either approve the order or cancel it. If the proposed automation is correct, the user can confirm this using confirm button 822, and the automation is then generated (e.g., to be executed by RPA robot(s)). Once the process has been generated, in some embodiments, the user may drill down into the RPA workflow using an RPA designer application and make any desired edits to the workflow.

Figure 9:
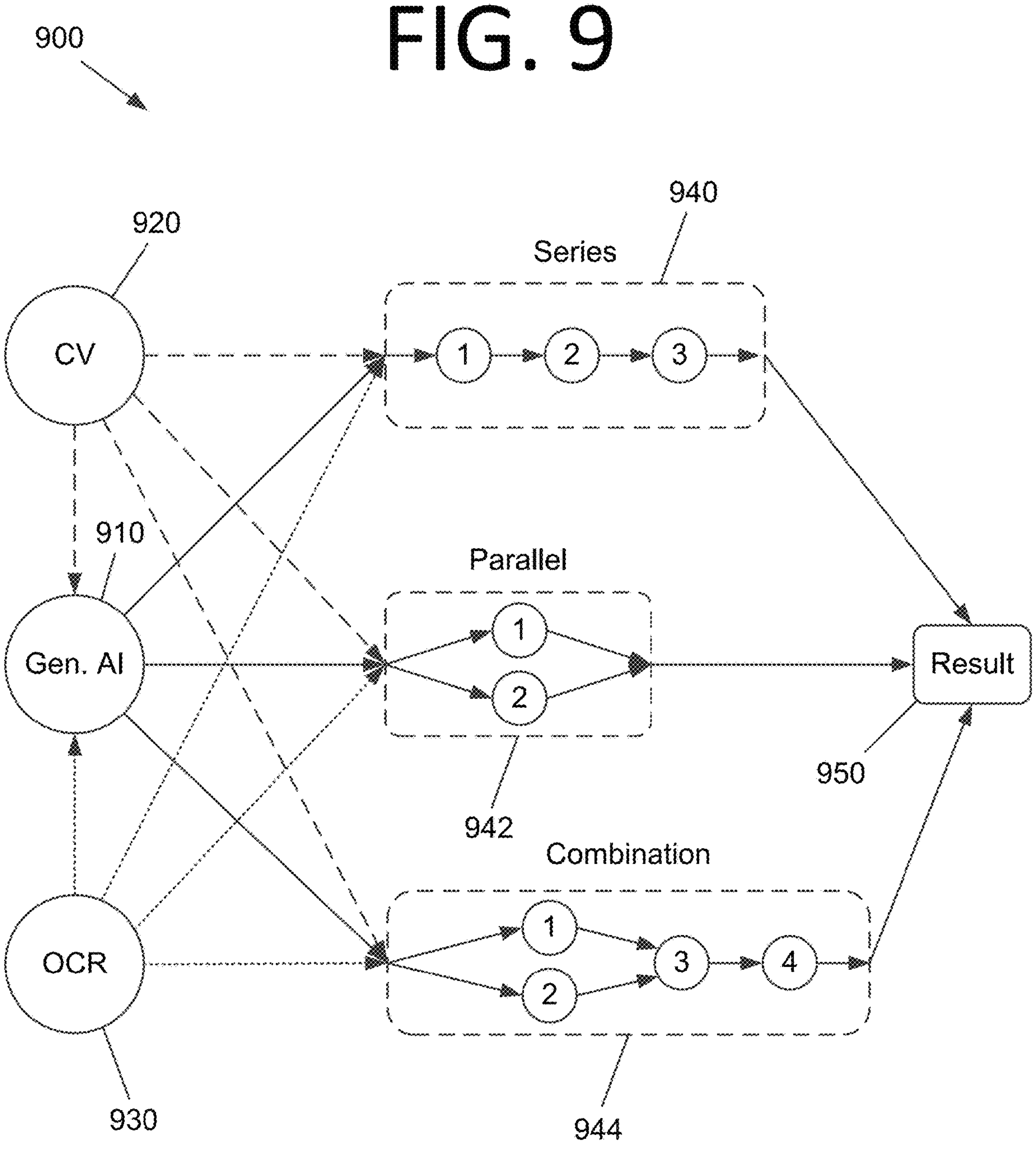
FIG. 9 illustrates AI/ML models of a cognitive AI layer, according to an embodiment of the present invention.

FIG. 9 illustrates AI/ML models of a cognitive AI layer 900, according to an embodiment of the present invention. The models of cognitive AI layer 900 may be trained using process 700 of FIG. 7 in some embodiments. A generative AI model 910 provides results to other cognitive AI layer models in a series configuration 940, a parallel configuration 942, or a combination of series and parallel configuration(s) 944. In some embodiments, the cognitive layer may be a single generative AI model. For instance, the generative AI model may generate code, provide sematic associations between text on the screen, suggest expressions and code snippets for RPA workflow activities, generate applications based on UI drawings, provide descriptions based on recordings of user actions, etc. A CV model 920 and an OCR model also provide detected graphical elements and recognized text, respectively, to generative AI model 910 and the other cognitive AI layer models in configuration 940, 942, or 944.

The other cognitive AI layer models in configuration 940, 942, or 944 use the output from generative AI model 910, CV model 920, and/or OCR model 930 to provide the automatic code generation functionality discussed in detail herein. Cognitive AI layer 900 may facilitate understanding of what code should be added in an RPA workflow, what code should be converted to another language in the workflow, which RPA workflows to suggest based on user actions, what description should be generated based on a recording of a user performing a task on a computing system, which applications to generate based on these actions, UI drawings, a combination thereof, etc. The output from the other cognitive AI layer models in configuration 940, 942, or 944 (i.e., results 950) may include RPA workflows with expressions and/or code in pertinent programming languages included therein, a newly generated RPA workflow, a human-like description of a task that a user is performing on a computing system, an application, etc.

Figure 10:
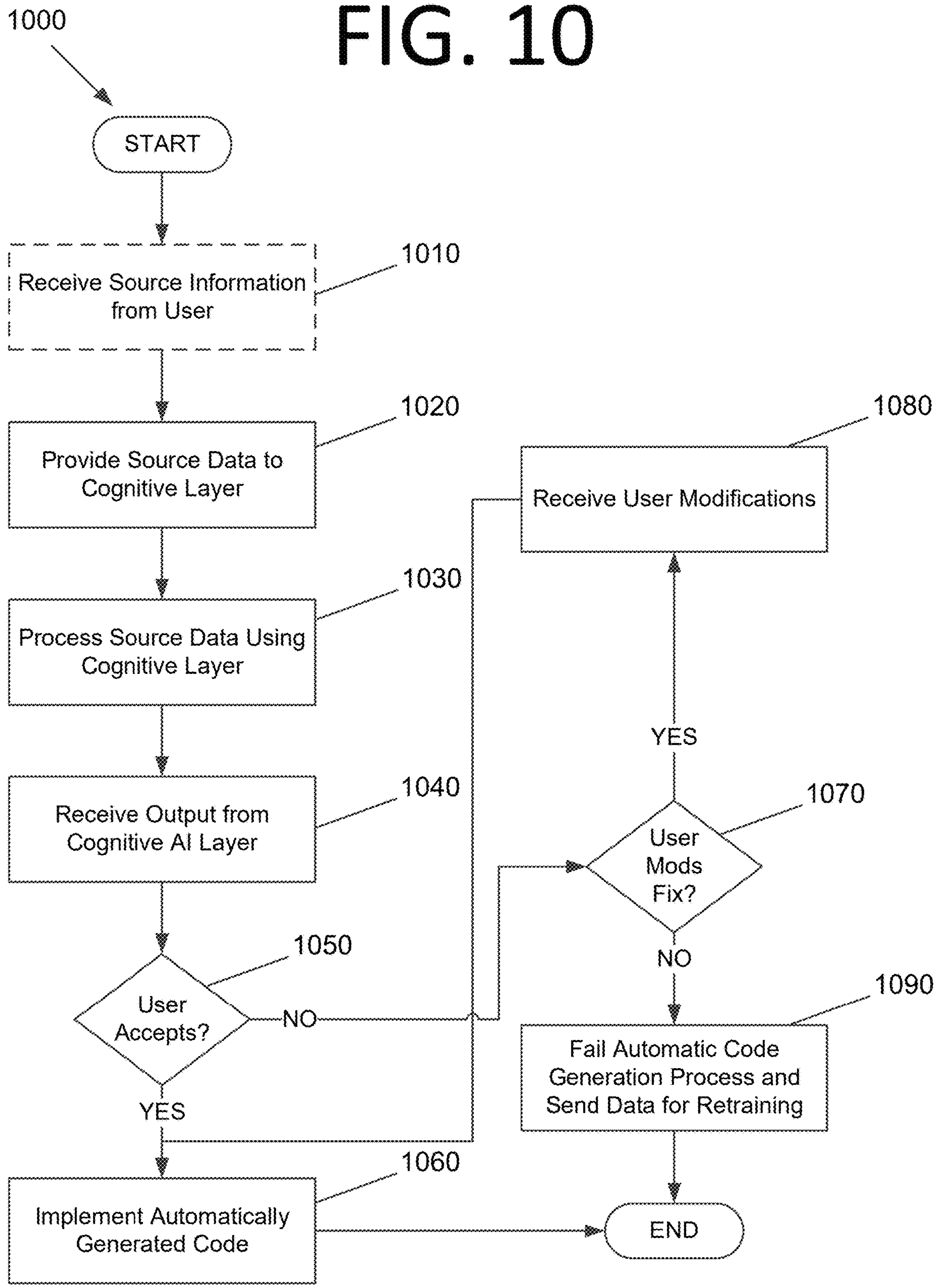
FIG. 10 is a flowchart illustrating a process for automatic code generation for RPA, according to an embodiment of the present invention.

FIG. 10 is a flowchart illustrating a process 1000 for automatic code generation for RPA, according to an embodiment of the present invention. In some embodiments, the process begins with receiving source information from a user at 1020. However, in other embodiments this may be provided to the system automatically. The source data is provided to a cognitive AI layer at 1020. The cognitive AI layer is one or more AI/ML models. In some embodiments, the cognitive AI layer is part of the computer program that performs the automatic code generation process, such as an RPA designer application, an RPA robot, etc. The source data may include, but is not limited to, an RPA workflow, a natural language sentence, a recording off a user's speech, a video recording of a user's actions on a computing system, a source document (e.g., a spreadsheet file, a JSON file, an XAML file, an XML file, an HTML file, a Word® document, a PDF file, a scanned image of a physical document, etc.), pseudocode for the desired task, a drawing of a desired user interface or form, a drawing of a process, any combination thereof, etc.

The source data is then processed by the cognitive AI layer at 1030 (i.e., the cognitive AI layer runs the input source information through its AI/ML model(s)) and the cognitive AI layer provides an output at 1040. For instance, the output of the cognitive AI layer may be provided to an RPA designer application, an RPA robot, or some other process that can implement the automatically generated code in a useful manner. The output from the cognitive AI layer may include, but is not limited to, an existing RPA workflow with expression(s) and/or code snippet(s) in pertinent programming language(s) included therein, a newly generated RPA workflow, a human-like description of a task that a user is performing on a computing system, an application, expression(s) and/or code snippet(s), etc.

If a user accepts the automatically generated code from the cognitive AI layer at 1050, the automatically generated code is implemented at 1060. For instance, an RPA workflow is updated in an RPA designer application by adding expressions and/or code snippets to activities thereof and/or their configurations, an RPA workflow generated by the cognitive AI layer is compiled into an automation for execution by an RPA robot at runtime, a description of a computer-implemented task is saved to a database and provided to other users, an application generated by the cognitive AI layer is deployed to user computing systems, etc. In some embodiments, this may be done automatically without manual user acceptance. In certain embodiments, the implementation of the automatically generated code at 1050 includes adding security and/or compliance rules to the RPA workflow for compliance with laws and/or policies. In some embodiments, the implementation of the automatically generated code includes compiling the RPA workflow into an automation configured to be executed by an RPA robot at runtime.

If the user does not accept the cognitive AI layer output at 1050, and a modification by the user can fix the automatically generated code at 1070 (e.g., the user can change an expression, correct grammar in an automatically generated document, etc.), the user can make the change at 1080 and the automatically generated code may be implemented at 1060. However, this may not be possible in some cases. For instance, a user may not know how to modify code of an automatically generated application to fix an error therein, the output from the cognitive AI layer may be unintelligible to the user, the suggested RPA workflow/automation may be wrong, etc. In this case, the user may fail the automatic code generation process and data pertaining to the failure may be sent for retraining AI/ML model(s) of the cognitive AI layer at 1090. For instance, the user may provide a text description regarding what elements of the automatically generated code were incorrect and why.

Figure 11:
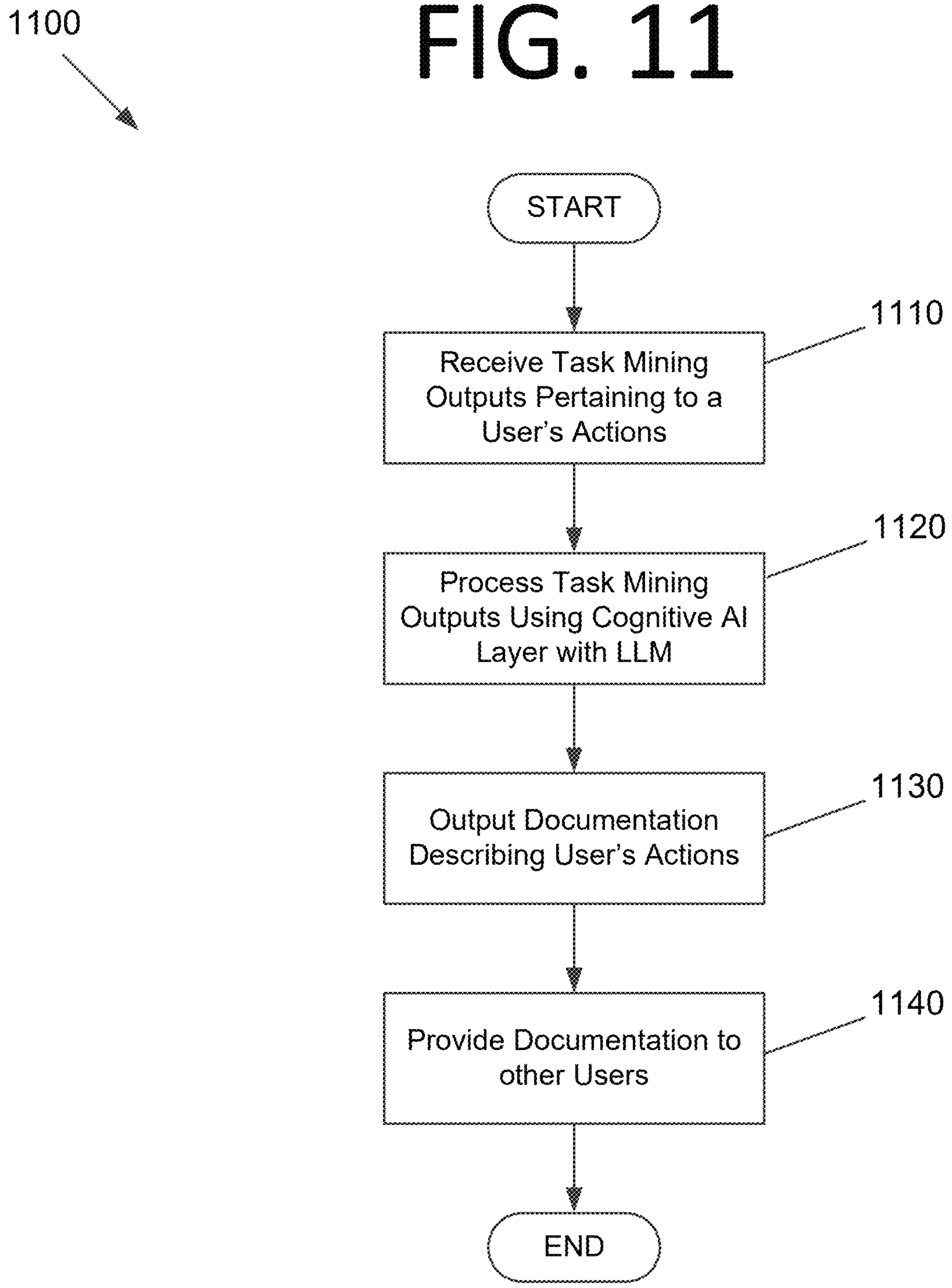
FIG. 11 is a flowchart illustrating a process for automatic documentation generation using a cognitive AI layer, according to an embodiment of the present invention.

FIG. 11 is a flowchart illustrating a process 1100 for automatic documentation generation using a cognitive AI layer, according to an embodiment of the present invention. The process begins with receiving task mining outputs pertaining to a user's actions at 1110. The task mining outputs may include, but are not limited to, what applications a user is using, what information is entered into these applications, key presses, mouse clicks and locations, graphical elements in the UI, which graphical elements are the active elements at various times (e.g., a current element that the user is typing into, where the cursor is located, etc.), etc.

The task mining outputs are provided as input to the cognitive AI layer and processed at 1120. The cognitive AI layer includes an LLM that is configured to analyze the task mining inputs and generate text (and in some embodiments, images) based on the task mining outputs. As such, the cognitive AI layer determines what a user was doing based on the task mining outputs and documents the process at 1130. For instance, the LLM of the cognitive AI layer may be used to generate a human-like description of the operations that the user is performing, potentially including screenshots. This information may then be provided as a manual for other users that want to perform the respective tasks at 1140.

Figure 12:
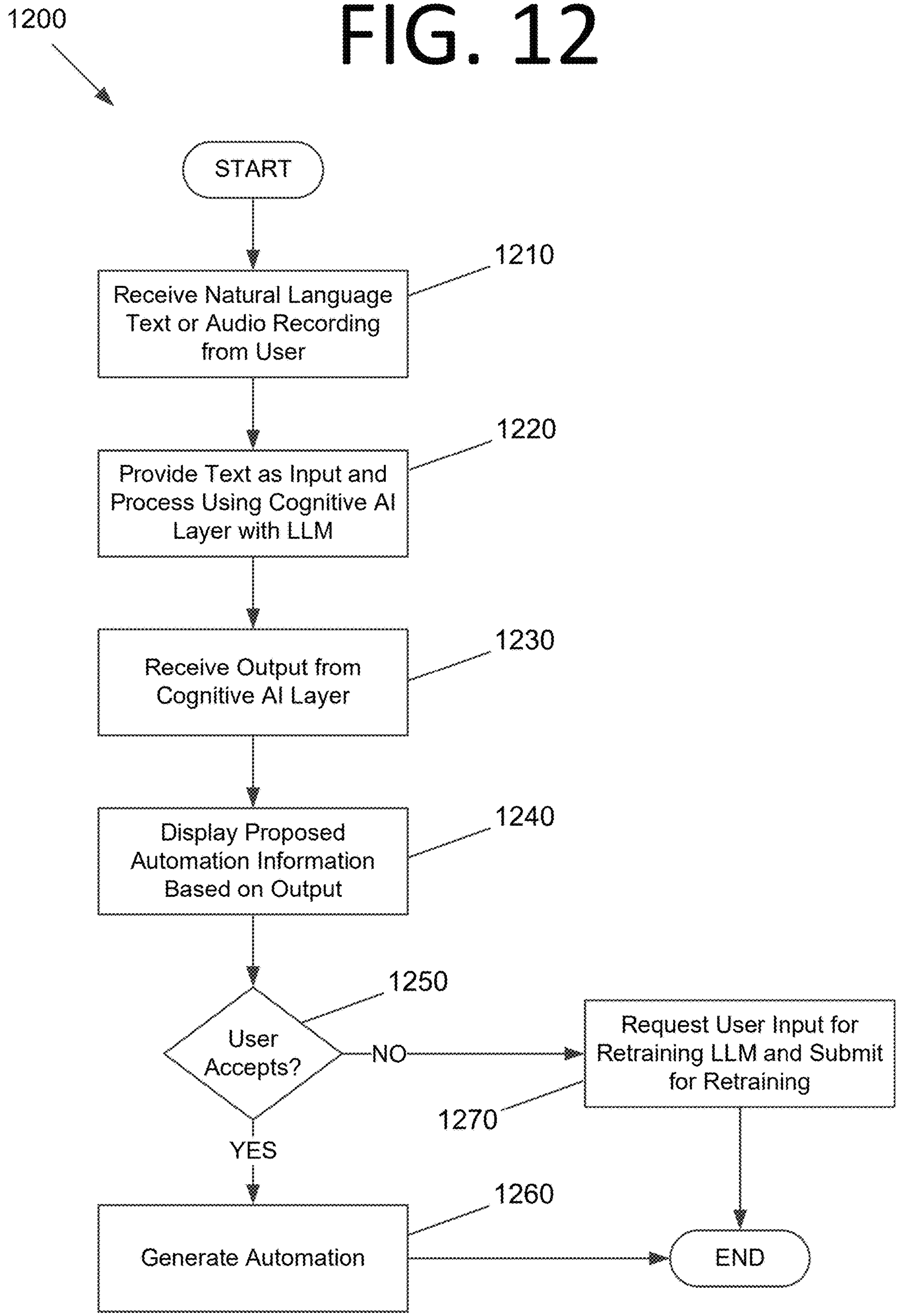
FIG. 12 is a flowchart illustrating a process for generating automations from natural language text, according to an embodiment of the present invention.

FIG. 12 is a flowchart illustrating a process 1200 for generating automations from natural language text, according to an embodiment of the present invention. The process begins with receiving natural language text or audio recording from a user at 1210. In the latter case, the audio is converted to text using a speech-to-text model. In some embodiments, the natural language text may be input by the user in an application with an automatic code generation interface. See FIGS. 8A-C, for example.

A cognitive AI layer with an LLM receives the natural language text as an input and processes the text at 1220. An application with an automatic code generation interface receives the output from the cognitive AI layer at 1230, which includes information pertaining to a proposed automation, and displays the proposed automation steps at 1240. For instance, the rules, tasks, steps, etc. associated with the proposed automation may be displayed.

If the user accepts the automation at 1250, the automation is generated at 1260. The automation may be a stand-alone application or an automation executed by an RPA robot. If the proposed automation is not accepted by the user at 1250, the automatic code generation interface requests user input regarding what was incorrect about the proposed automation and submits the information for retraining the LLM at 1270.

The process steps performed in FIGS. 7 and 10-12 may be performed by a computer program, encoding instructions for the processor(s) to perform at least part of the process(es) described in FIGS. 7 and 10-12, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIGS. 7 and 10-12, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A non-transitory computer-readable medium storing a computer program, the computer program configured to cause at least one processor to:

provide source data to a cognitive artificial intelligence (AI) layer as input, the cognitive AI layer trained-to process the input source data by automatically generating computer program code comprising at least one of one or more expressions and one or more code snippets;

receive an output from the cognitive AI layer, the output from the cognitive AI layer comprising automatically generated code, the automatically generated code comprising the at least one of the one or more expressions and the one or more code snippets; and implement the automatically generated code in a robotic process automation (RPA) workflow by converting a portion of current code of the RPA workflow with code, converting the portion of the current code to another programming language, wherein the output from the cognitive AI layer comprises the at least one of the one or more expressions and the one or more code snippets, the implementing of the automatically generated code comprises updating the RPA workflow by adding the at least one of the one or more expressions and the one or more code snippets to one or more respective activities of the RPA workflow, the one or more expressions are syntactic entities in a programming language that are-be evaluated to determine a value of the one or more expressions and are a combination of one or more constants, variables, functions, and operators that a programming language interprets according to particular rules of precedence and of association and computes to produce another value, and the one or more code snippets are regions of reusable source code, machine code, or text.

2. The non-transitory computer-readable medium of claim 1, wherein the source data comprises at least one of natural language text, a recording of a user's speech, a video recording of a user's actions on a computing system, a document, pseudocode for a task, a drawing of a user interface or form, a drawing of a process, process documentation or a process description, and an RPA workflow.

3. The non-transitory computer-readable medium of claim 1, wherein the computer program comprises the cognitive AI layer.

4. The non-transitory computer-readable medium of claim 1, wherein the computer program is an RPA designer application.

5. The non-transitory computer-readable medium of claim 1, wherein the output from the cognitive AI layer comprises the RPA workflow.

6. The non-transitory computer-readable medium of claim 1, wherein the output from the cognitive AI layer comprises one or more configuration changes for the RPA workflow and the implementing of the automatically generated code comprises updating the RPA workflow by changing one or more respective activities of the RPA workflow to include the one or more configuration changes.

7. The non-transitory computer-readable medium of claim 1, wherein the implementing of the automatically generated code comprises compiling the RPA workflow into an automation configured to be executed by an RPA robot at runtime.

8. The non-transitory computer-readable medium of claim 1, wherein the computer program is further configured to cause the at least one processor to:

prompt a user regarding the output from the cognitive AI layer;

receive an indication that the user does not accept the output from the cognitive AI layer;

receive one or more modifications to the RPA workflow from the user; and modify the RPA workflow to include the output from the cognitive AI layer with the modifications from the user.

9. The non-transitory computer-readable medium of claim 1, wherein the computer program is further configured to cause the at least one processor to:

prompt a user regarding the output from the cognitive AI layer;

receive an indication that the user does not accept the output from the cognitive AI layer; and fail the automatic code generation and send data pertaining to the failure for retraining one or more AI/machine learning (ML) models of the cognitive AI layer.

10. The non-transitory computer-readable medium of claim 1, wherein the cognitive AI layer comprises:

a generative AI model configured to at least one of generate code, provide sematic associations between text on a screen, suggest expressions and code snippets for activities of the RPA workflow, generate a form from a natural language description or a drawing, and generate a process from a drawing; and one or more other AI/machine learning (ML) models configured to use output from the generative AI model to provide automatic code generation functionality.

11. The non-transitory computer-readable medium of claim 1, wherein the computer program is further configured to cause the at least one processor to:

add security and/or compliance rules to the RPA workflow for compliance with laws and/or policies.

12. One or more computing systems, comprising:

memory storing computer program instructions; and at least one processor configured to execute the stored computer program instructions, wherein the computer program instructions are configured to cause the at least one processor to:

provide source data to a cognitive artificial intelligence (AI) layer as input, the cognitive AI layer trained to process the input source data by automatically generating computer program code comprising at least one of one or more expressions and one or more code snippets;

receive an output from the cognitive AI layer, the output from the cognitive AI layer comprising automatically generated code, the automatically generated code comprising the at least one of the one or more expressions and the one or more code snippets; and implement the automatically generated code in a robotic process automation (RPA) workflow by converting a portion of current code of the RPA workflow with code, converting the portion of the current code to another programming language, wherein the source data comprises at least one of natural language text, a recording of a user's speech, a video recording of a user's actions on a computing system, a document, pseudocode for a task, a drawing of a user interface or form, a drawing of a process, process documentation or a process description, and an RPA workflow, and the output from the cognitive AI layer comprises the at least one of the one or more expressions and the one or more code snippets, the implementing of the automatically generated code comprises updating the RPA workflow by adding the at least one of the one or more expressions and the one or more code snippets to one or more respective activities of the RPA workflow, the one or more expressions are syntactic entities in a programming language that are-be evaluated to determine a value of the one or more expressions- and are a combination of one or more constants, variables, functions, and operators that a programming language interprets according to particular rules of precedence and of association and computes to produce another value, and the one or more code snippets are regions of reusable source code, machine code, or text.

13. The one or more computing systems of claim 12, wherein the computer program instructions comprise the cognitive AI layer.

14. The one or more computing systems of claim 12, wherein the output from the cognitive AI layer comprises the RPA workflow.

15. The one or more computing systems of claim 12, wherein the output from the cognitive AI layer comprises one or more configuration changes for the RPA workflow and the implementing of the automatically generated code comprises updating the RPA workflow by changing one or more respective activities of the RPA workflow to include the one or more configuration changes.

16. The one or more computing systems of claim 12, wherein the implementing of the automatically generated code comprises compiling the RPA workflow into an automation configured to be executed by an RPA robot at runtime.

17. The one or more computing systems of claim 12, wherein the computer program instructions are further configured to cause the at least one processor to:

prompt the user regarding the output from the cognitive AI layer;

receive an indication that the user does not accept the output from the cognitive AI layer;

receive one or more modifications to the RPA workflow from the user; and modify the RPA workflow to include the output from the cognitive AI layer with the modifications from the user.

18. The one or more computing systems of claim 12, wherein the computer program instructions are further configured to cause the at least one processor to:

prompt the user regarding the output from the cognitive AI layer;

receive an indication that the user does not accept the output from the cognitive AI layer; and fail the automatic code generation and send data pertaining to the failure for retraining one or more AI/machine learning (ML) models of the cognitive AI layer.

19. The one or more computing systems of claim 12, wherein the cognitive AI layer comprises:

a generative AI model configured to at least one of generate code, provide sematic associations between text on a screen, suggest expressions and code snippets for activities of the RPA workflow, generate a form from a natural language description or a drawing, and generate a process from a drawing; and one or more other AI/machine learning (ML) models configured to use output from the generative AI model to provide automatic code generation functionality.

20. The one or more computing systems of claim 12, wherein the computer program instructions are further configured to cause the at least one processor to:

add security and/or compliance rules to the RPA workflow for compliance with laws and/or policies.

21. A computer-implemented method for performing automatic code generation, comprising:

providing source data to a cognitive artificial intelligence (AI) layer as input, by a computing system, the cognitive AI layer trained-to process the input source data by automatically generating computer program code comprising at least one of one or more expressions and one or more code snippets;

receiving an output from the cognitive AI layer, by the computing system, the output from the cognitive AI layer comprising automatically generated code, the automatically generated code comprising the at least one of the one or more expressions and the one or more code snippets; and implement the automatically generated code in a robotic process automation (RPA) workflow by converting a portion of current code of the RPA workflow with code, converting the portion of the current code to another programming language, by the computing system, wherein the source data comprises at least one of natural language text, a recording of a user's speech, a video recording of a user's actions on the computing system, a document, pseudocode for a task, a drawing of a user interface or form, a drawing of a process, process documentation or a process description, and an RPA workflow, and the output from the cognitive AI layer comprises the at least one of the one or more expressions and the one or more code snippets, the implementing of the automatically generated code comprises updating the RPA workflow by adding the at least one of the one or more expressions and the one or more code snippets to one or more respective activities of the RPA workflow, the one or more expressions are syntactic entities in a programming language that are-be evaluated to determine a value of the one or more expressions-and are a combination of one or more constants, variables, functions, and operators that a programming language interprets according to particular rules of precedence and of association and computes to produce another value, and the one or more code snippets are regions of reusable source code, machine code, or text.

22. The computer-implemented method of claim 21, wherein the output from the cognitive AI layer comprises one or more configuration changes for the RPA workflow and the implementing of the automatically generated code comprises updating the RPA workflow by changing one or more respective activities of the RPA workflow to include the one or more configuration changes.

23. The computer-implemented method of claim 21, wherein the implementing of the automatically generated code comprises compiling the RPA workflow into an automation configured to be executed by an RPA robot at runtime.

24. The computer-implemented method of claim 21, further comprising:

prompting the user regarding the output from the cognitive AI layer, by the computing system;

receiving an indication that the user does not accept the output from the cognitive AI layer, by the computing system;

receiving one or more modifications to the RPA workflow from the user, by the computing system; and modifying the RPA workflow to include the output from the cognitive AI layer with the modifications from the user, by the computing system.

25. The computer-implemented method of claim 21, further comprising:

prompting the user regarding the output from the cognitive AI layer, by the computing system;

receiving an indication that the user does not accept the output from the cognitive AI layer, by the computing system; and failing the automatic code generation and sending data pertaining to the failure for retraining one or more AI/machine learning (ML) models of the cognitive AI layer, by the computing system.

26. The computer-implemented method of claim 21, wherein the cognitive AI layer comprises:

a generative AI model configured to at least one of generate code, provide sematic associations between text on a screen, suggest expressions and code snippets for activities of the RPA workflow, generate a form from a natural language description or a drawing, and generate a process from a drawing; and one or more other AI/machine learning (ML) models configured to use output from the generative AI model to provide automatic code generation functionality.

27. The computer-implemented method of claim 21, further comprising:

adding security and/or compliance rules to the RPA workflow for compliance with laws and/or policies.

* * * * *